No. 627,359. Patented June 20, 1899.
H. B. STEELE.
AUTOMOBILE VEHICLE.
(Application filed Jan. 18, 1897.)
(No Model.) 9 Sheets—Sheet I.

WITNESSES

INVENTOR
Herbert B Steele

No. 627,359. Patented June 20, 1899.
H. B. STEELE.
AUTOMOBILE VEHICLE.
(Application filed Jan. 18, 1897.)
(No Model.) 9 Sheets—Sheet 2.

No. 627,359. Patented June 20, 1899.
H. B. STEELE.
AUTOMOBILE VEHICLE.
(Application filed Jan. 18, 1897.)
(No Model.) 9 Sheets—Sheet 4.

WITNESSES
INVENTOR
Herbert B Steele

No. 627,359. Patented June 20, 1899.
H. B. STEELE.
AUTOMOBILE VEHICLE.
(Application filed Jan. 18, 1897.)
(No Model.) 9 Sheets—Sheet 6.

WITNESSES

INVENTOR

No. 627,359.  
H. B. STEELE.  
AUTOMOBILE VEHICLE.  
(Application filed Jan. 18, 1897.)  
(No Model.) 9 Sheets—Sheet 7.

WITNESSES  
INVENTOR  
Herbert B. Steele.

No. 627,359. Patented June 20, 1899.
H. B. STEELE.
AUTOMOBILE VEHICLE.
(Application filed Jan. 18, 1897.)
(No Model.) 9 Sheets—Sheet 9.

WITNESSES
INVENTOR
Herbert B Steele

UNITED STATES PATENT OFFICE.

HERBERT B. STEELE, OF MALDEN, MASSACHUSETTS.

AUTOMOBILE VEHICLE.

SPECIFICATION forming part of Letters Patent No. 627,359, dated June 20, 1899.

Application filed January 18, 1897. Serial No. 619,545. (No model.)

*To all whom it may concern:*

Be it known that I, HERBERT B. STEELE, a citizen of the United States, residing at Malden, in the county of Middlesex and Commonwealth of Massachusetts, have invented a certain new and useful Automobile Vehicle, of which the following is a full, clear, and exact description, reference being had to the accompanying drawings, forming a part of this specification, in explaining its nature.

My invention consists in devices for modifying the application of power to the propelling-wheel of the vehicle, in devices for enabling the rider to control the power and speed of the vehicle, in improvements in the driving engine or motor and in the adaptation thereof for use upon vehicles and also in connection with said devices for modifying the application of power, in devices for maintaining a uniform speed of said engine or motor, and in structural details hereinafter specified.

In the following description my invention is shown embodied in a machine of the safety-bicycle type, and the engine or motor is of the kind known as "explosion-engines."

Figure 1:
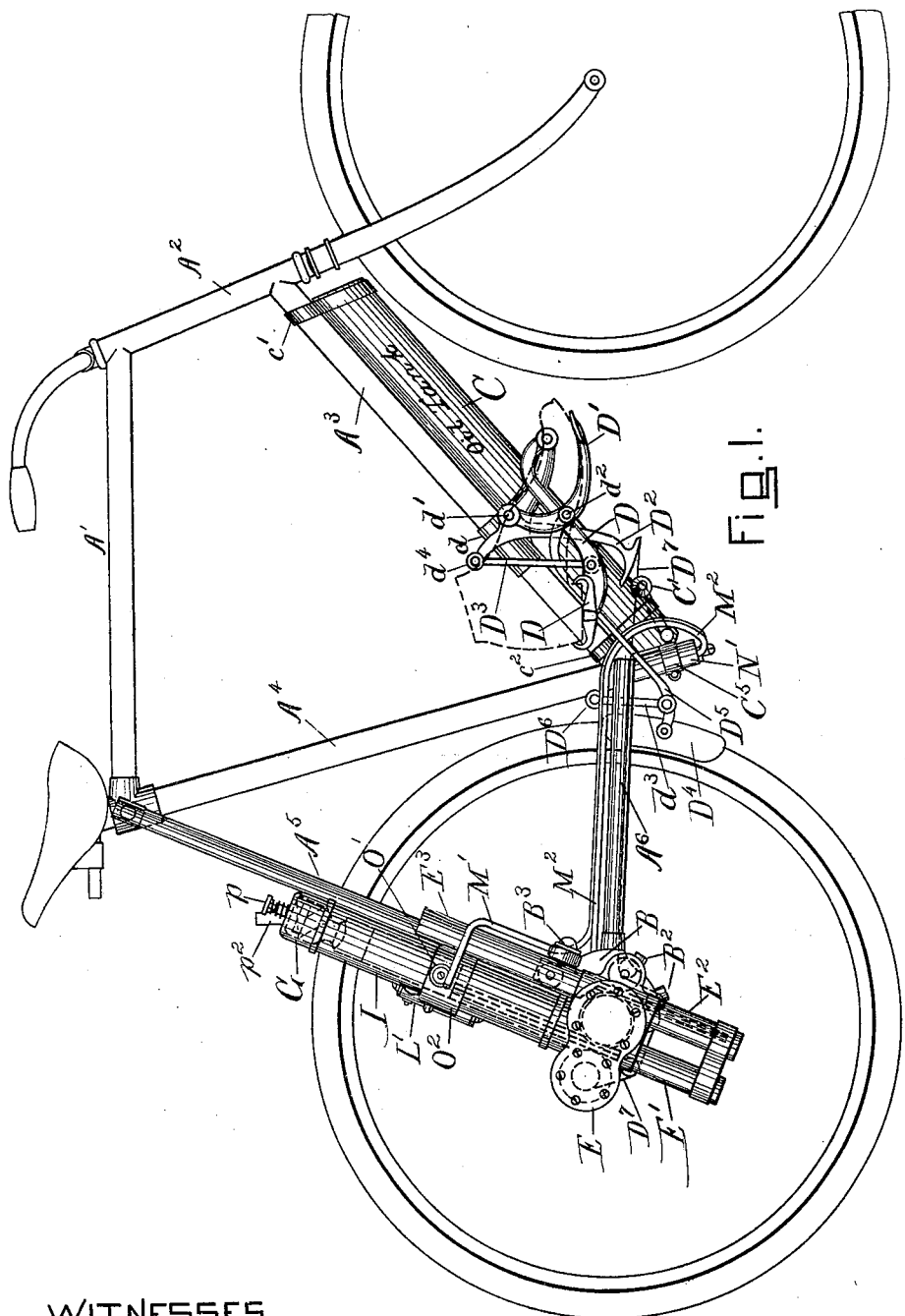
Figure 2:
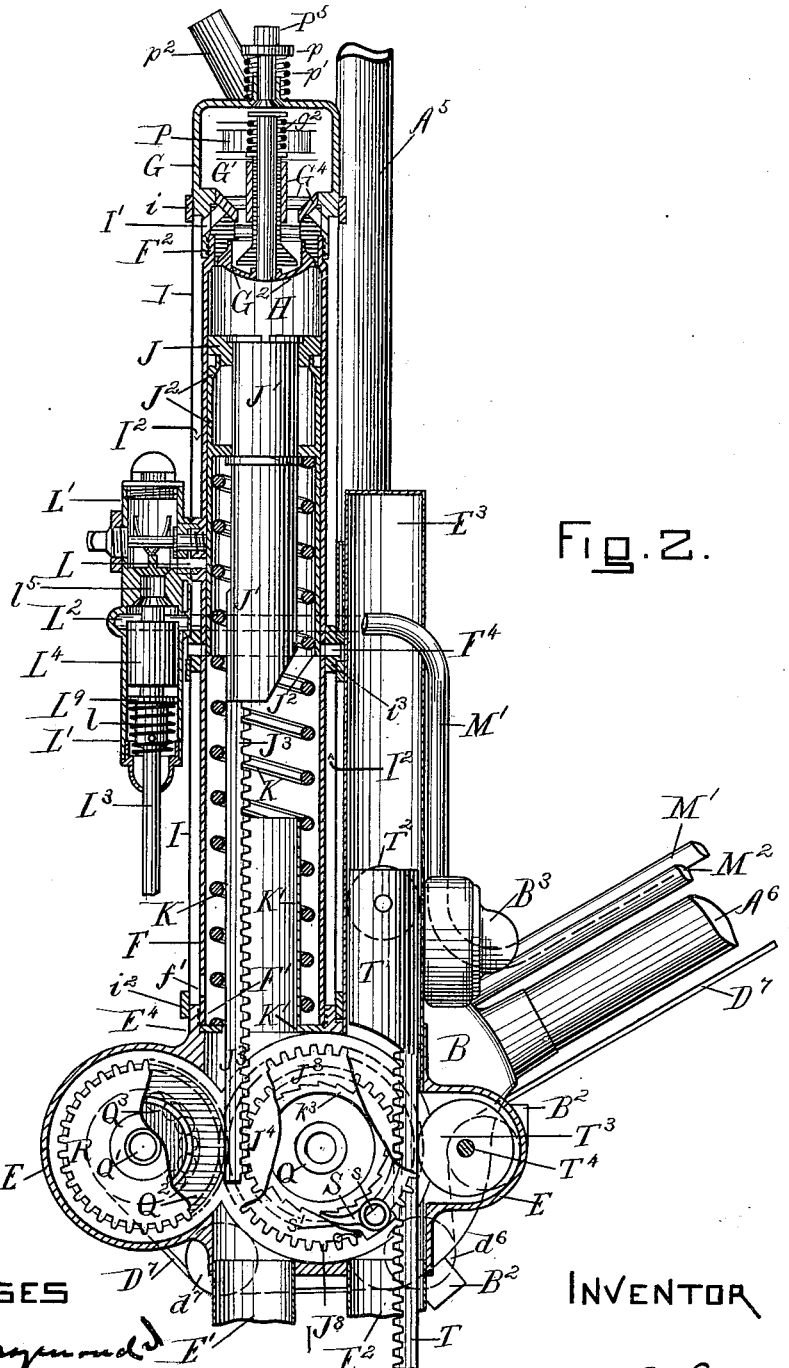
Figure 3:
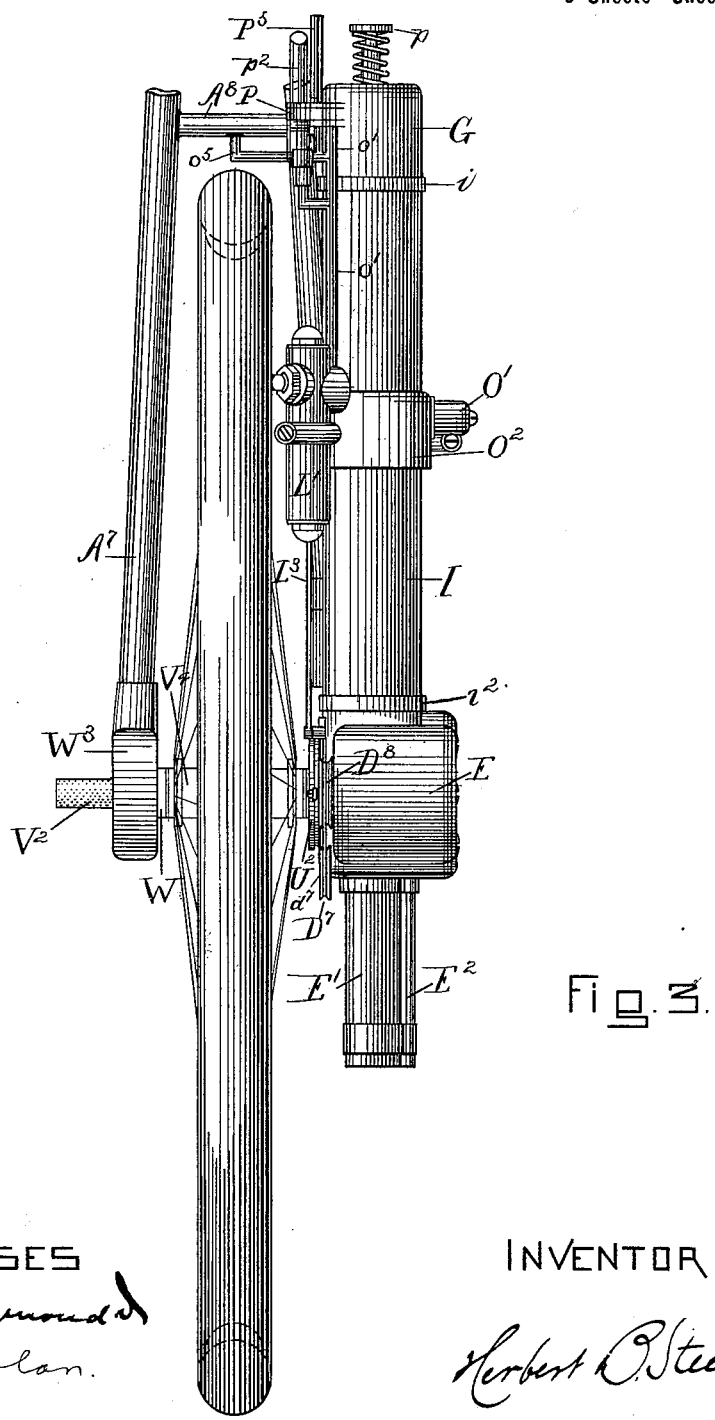
Figure 4:
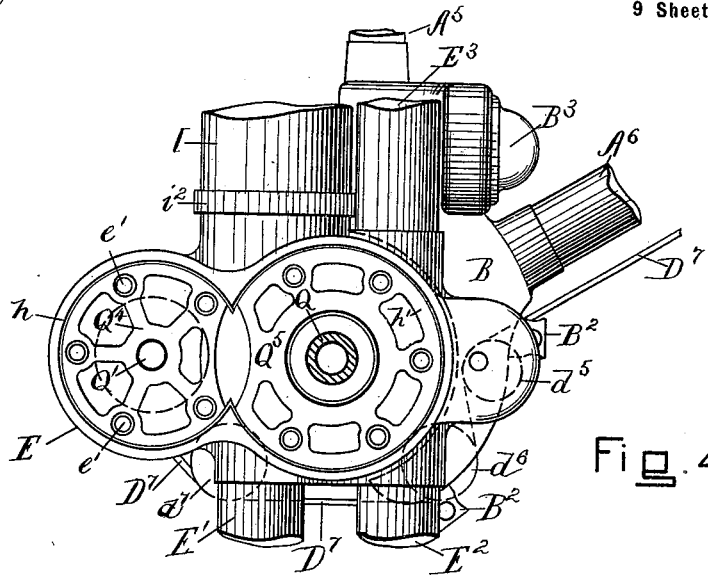
Figure 5:
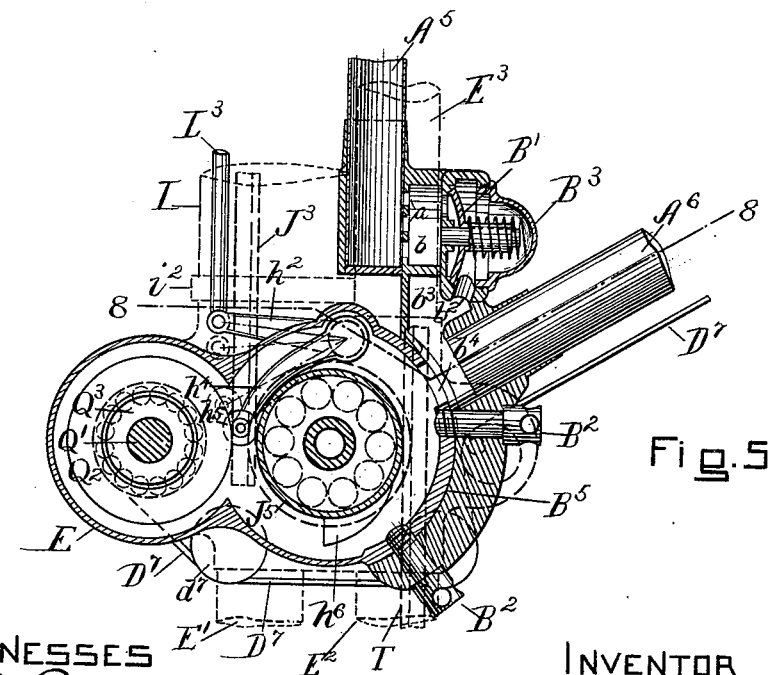
Figure 6:
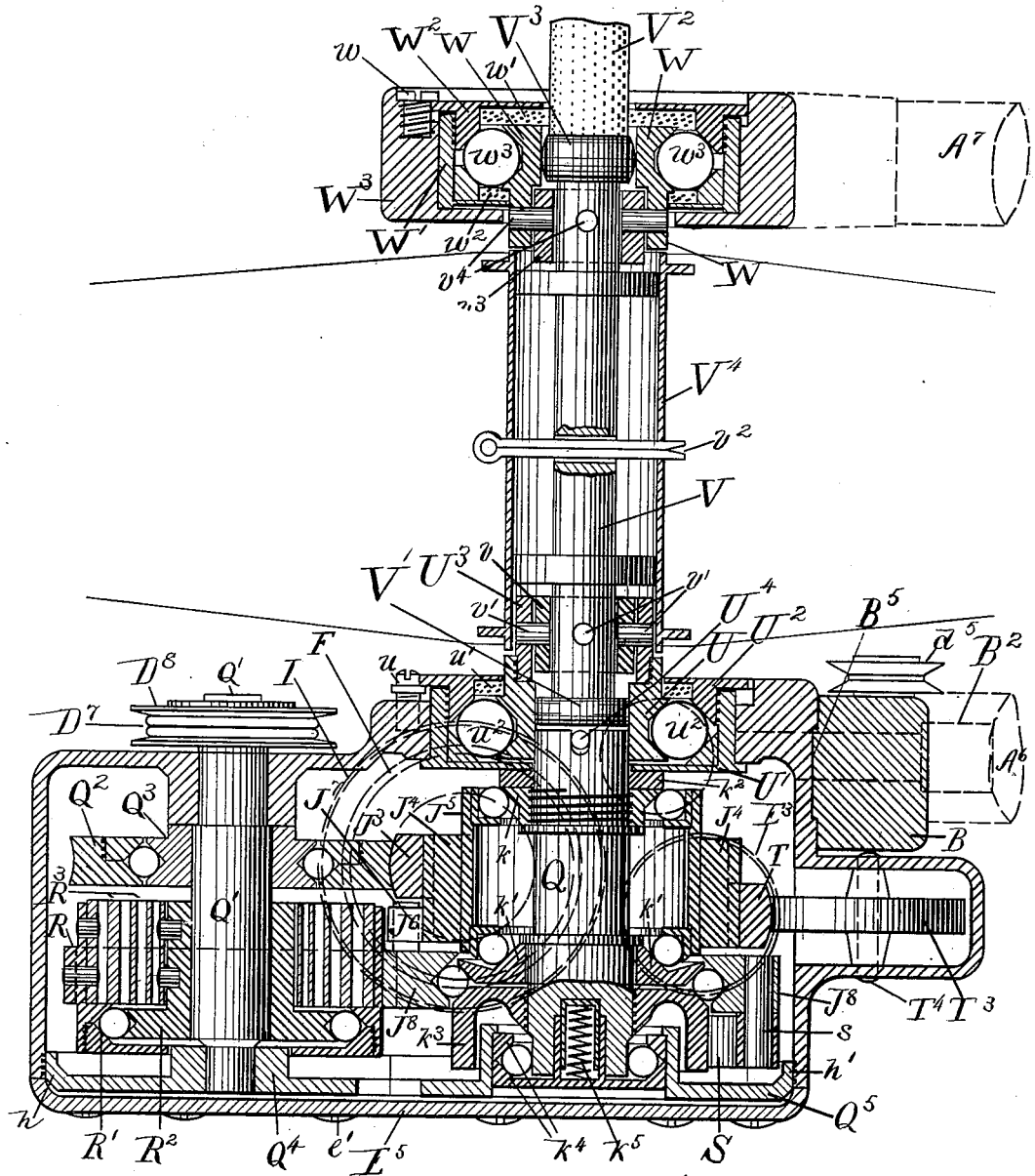
Figure 7:
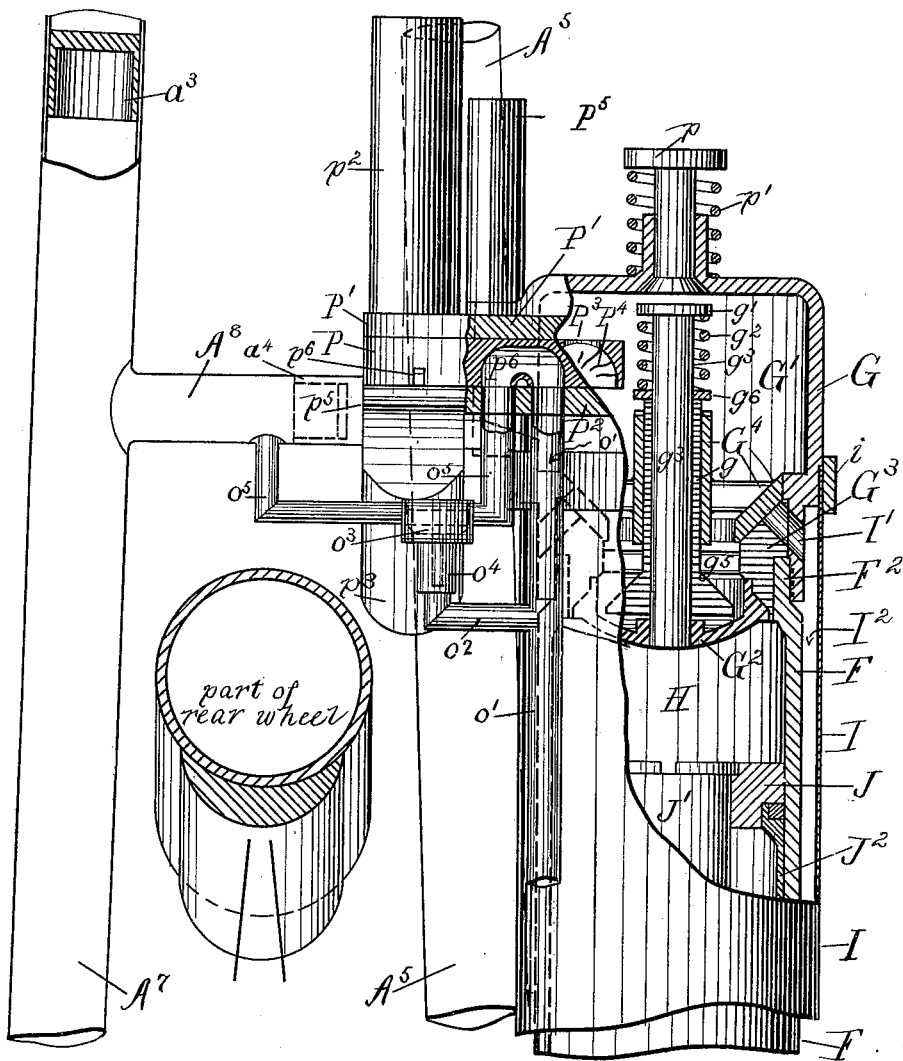
Figure 8:
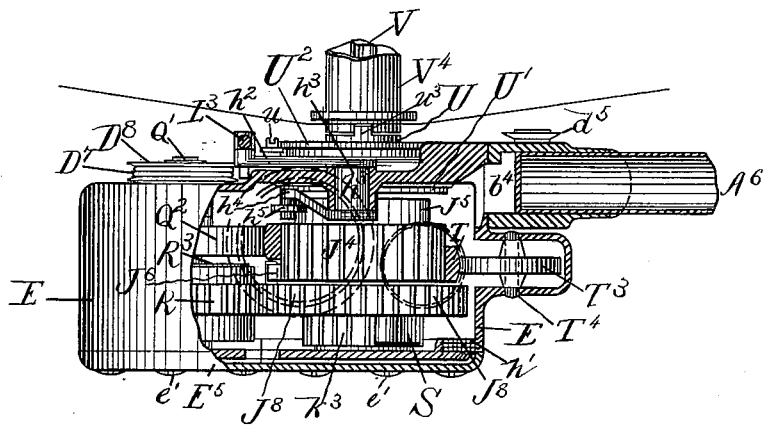
Figure 9:
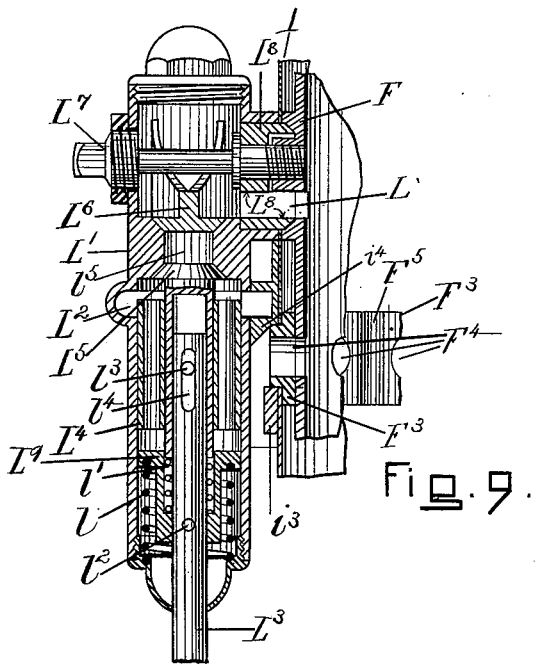
Figure 10:
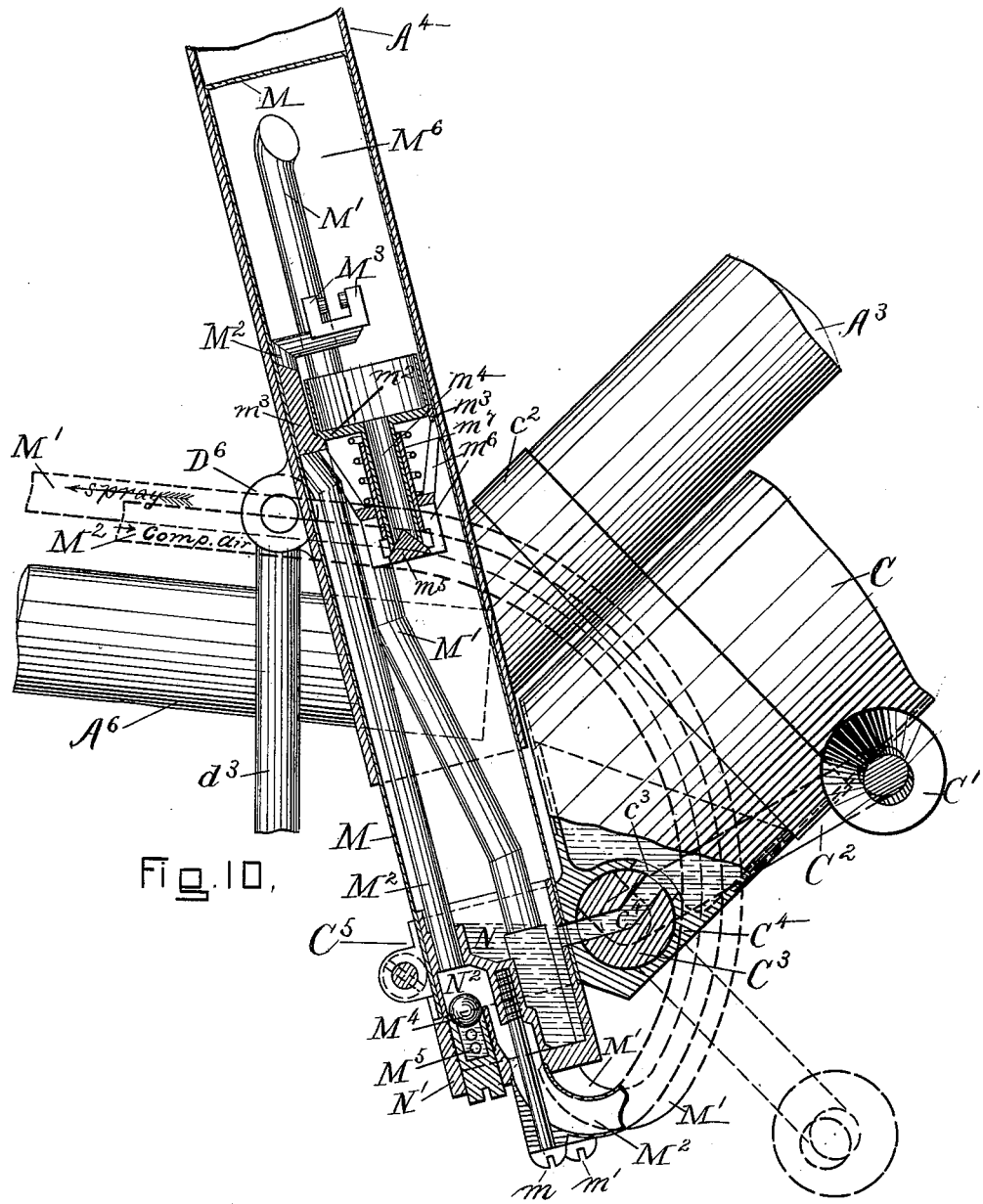
Figure 11:
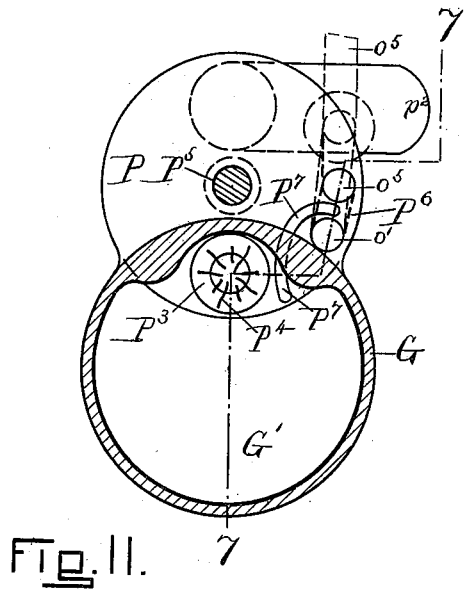
Figure 12:
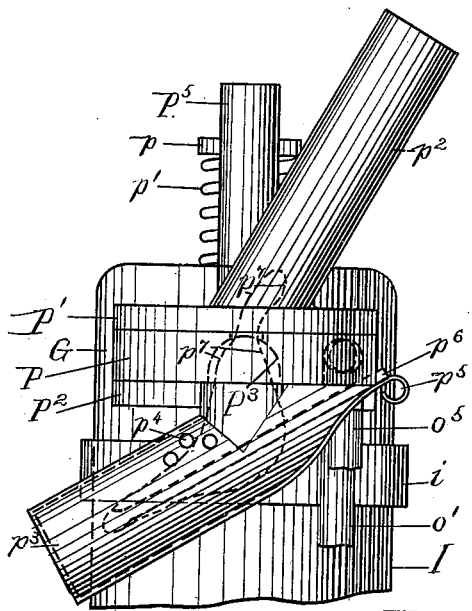
Figure 13:
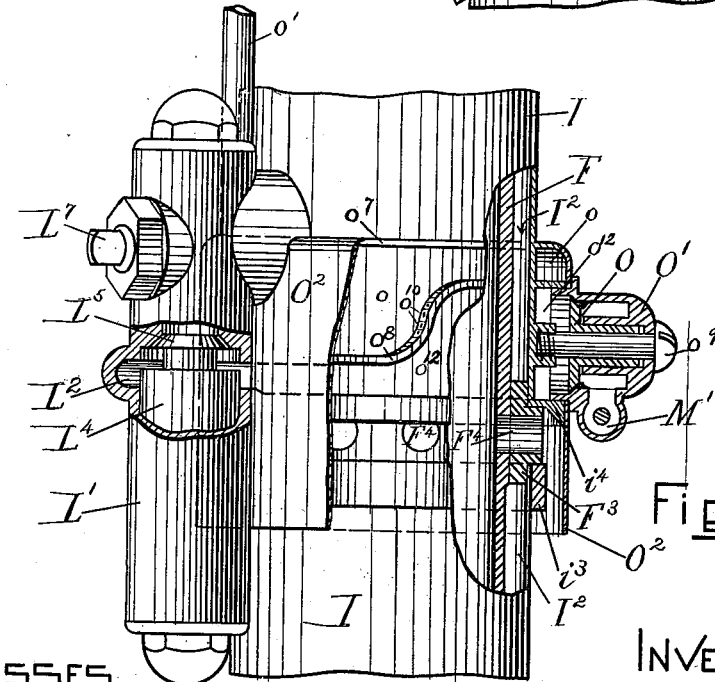

In the drawings, Figure 1 is a view in side elevation of the entire machine. Fig. 2 is a longitudinal central section, much enlarged, of the engine and case, and in this view and in all succeeding ones the engine is shown as if vertical on account of convenience in executing the drawings. Fig. 3 is an enlarged view in elevation of the rear of the vehicle and from the left-hand end of Fig. 1. Fig. 4 is an enlarged view in elevation of the central case containing the modifying or converting mechanism and portions of parts attached, the cap of said case being removed. Fig. 5 is a section taken through the case and parts of Fig. 4 on a plane through the center lines of the frame-tubes and shows especially the mechanism for driving the device or valve controlling the admission of vapor to the engine and also certain air-passages in one of the frame-tubes. Fig. 6 is a view, much enlarged, in horizontal section through the center of the case and the axle of the vehicle, representing the power modifying or transforming devices, their relation to each other and to the said axle, and the construction of said axle. Fig. 7 is a view, much enlarged, of the power end of the engine and attached parts with a portion broken out to show a partial central section of the engine, a portion of the ignition-valve being also broken away to show the vapor-passage therein indicated by the section-line 7 7 of Fig. 11. Fig. 8 is a view in plan, enlarged, of the case containing the modifying or transforming devices, a portion thereof being broken out to show the mechanism beneath, being generally a section on the line 8 8 of Fig. 5. Fig. 9 is a vertical section, much enlarged, through the center of the vapor-admission device. Fig. 10 is a vertical section, much enlarged, taken centrally through the lower portion of the vehicle-frame and showing particularly the devices for handling and spraying the oil. Fig. 11 is a view, much enlarged, of the under side of the ignition-valve. Fig. 12 is a view in elevation, much enlarged, of the top end of the engine from the opposite side of the machine from that shown in Fig. 1, representing the ignition device in full. Fig. 13 is a view in elevation, much enlarged, of the central portion of the engine and vapor-admission device with portions removed to exhibit the interior construction and the course of the oil to the vapor-admitting devices.

The frame of my improved vehicle in the form of construction shown follows closely the usual construction of the frame of the well-known safety-bicycle. It varies therefrom at the seat-post joint, at the joints of the axle of the rear wheel, and at the lower central joint. Below the lower forward diagonal brace $A^3$ and attached thereto is the oil-reservoir C and the foot-levers D D' for controlling the speed and power of the vehicle and which are also attached to said brace. Upon the joint B at the rear of the frame, on the side shown in Fig. 1, is carried an explosion-engine burning oil from the reservoir C, which it takes by means of the tubes $M'$ $M^2$, connecting the engine with a spraying device carried in the lower end of the central member $A^4$ of the vehicle-frame and with which spraying device the oil-reservoir communicates. The brake-shoe $D^4$ (see Fig. 1) is connected with the toe-lever D' by the long ogee-curved link $D^5$. The said toe-lever is pivoted to the bracket d at d' and is connected with the ogee link at $d^2$, and the rear end of the link is attached by a short link $d^3$ to the upright member $A^4$ of the frame. The depression of the toe-lever D' by the toe of the rider will move the brake-shoe against the tire of the rear or driving wheel.

The heel-lever D is pivoted at its forward end to the lower end of the bracket $d$ and is operated to draw or release the cord $D^7$ by means of the link $D^3$, attached at its lower end to the lever D and at its upper end $d^4$ to a lever $D^2$, which is pivoted at $d'$ to the bracket $d$ and the lower end of which is attached to or connected with the wire cord $D^7$, extending to the engine. Through this cord the movements of the said heel-lever are communicated to that part of the mechanism of the engine by which the amount of power delivered to the driving-wheel is regulated.

The hole provided by the tube $A^5$, forming the descending rear strut of the vehicle-frame, forms a passage by which air of combustion is fed to the engine. This tube should be made rather larger than is usual with the corresponding tubes—say of seven-eighths of an inch internal diameter—to provide a large air-passage, and the air enters the passage through the seat-joint from its under side and is there strained from dust by means of a tuft of raw cotton or other strainer contained therein. The air enters through the orifices $a$ (see Fig. 5) a cavity $b$ in the joint-piece B, to which piece the tube $A^5$ and the tube $A^6$ are firmly united. The air then passes through the opening controlled by the check-valve B' and through the passages $b^2 b^3$ in the joint-piece B and finally through the orifice $b^4$ into the interior of the lower casing E of the engine. The check-valve opens to admit the feeding of the air to the casing-chamber and closes to prevent its being forced backward through the same. It may have a spring to bear against it, hold it in place, and accelerate its action, if desired, and the valve is accessible by means of the removable cap $B^3$. The piston of the engine acts as an air-pump in connection with the chamber of the lower casing and the said air inlets and outlets, hereinafter referred to, causing the air to be drawn in through the inlet above described and to be forced outward to the spraying-chamber to combine with the oil therein and also to the piston-chamber to there combine with the vapor fed to it. The said lower casing E corresponds in a way to the bed-casting in the ordinary type of stationary engines or the crank-case in others. To it by means of a raised flange $E^4$ is rigidly secured the cylinder F of the engine, the lower end F' of the cylinder having a screw-thread by which it is screwed upon the threaded section of the said raised flange. There is also secured to the said casing E the bearings of the engine-shaft Q (see Fig. 6) and the bearings of the regulating-shaft Q'. (See same figure.) The casing has the part $B^5$ turned concentric with the engine-shaft, and it is secured by screws $B^2$ to a seat in the joint-piece B, which is bored concentric with the axle of the driving-wheel, the fastening-screws extending through the joint-piece and screwing into the case. This construction maintains the engine-shaft in line with the axle and at the same time permits the easy removal of the entire engine from the vehicle-frame.

The cylinder of the engine preferably lies along the rear diagonal of the frame. (See Fig. 1.) The piston is represented as built up from the pieces of tubing J J' $J^2$. This construction, however, is immaterial, and additional weights may be added in the cavities in proportioning the weight of the piston to its number of reciprocations per minute. Extending downward from the central portion J' of the piston and to which it is attached is a rack $J^3$, which engages or meshes with a gear $J^4$, (see Figs. 2, 6, and 8,) concentric with the engine-shaft and borne upon it by ball-bearings, so that the gear is free to turn on the shaft and the shaft within the gear. The power of the engine from the explosion of the charge above the piston is delivered by the piston through the said rack to the said gear and is transmitted to the engine-shaft by mechanism hereinafter described.

Below the piston, within the cylinder F and generally concentric therewith, is a powerful spring K, the function of which is to receive and store up sufficient of the power of the explosion on the downstroke of the piston to return or move upward the piston to its highest position and to compress the gaseous charge above the same. The lower end of this spring bears upon a plate K', which is held between the bottom end of the cylinder and the seat thereof in the central case and which plate has an upward tubular extension about which the lower end of the spring extends and which acts, together with the back of the rack, as a guide for the spring and to maintain it centrally in the cylinder. The spring at its upper end is held and guided centrally by the lower end of the tubular piston, within which the upper end of the spring extends and also within which the spring largely retracts during the downstroke of the engine. The upper end of the piston-chamber has a large opening, which is closed by the induction-valve $G^2$, normally held lightly to its seat by the spring $g^2$, bearing on the enlarged upper end $g'$ of the guiding-stem $g^3$. (See Fig. 7.) This valve closes upward, and a space H of the cylinder of sufficient size to receive a proper charge of the compressed explosive mixture is provided between the under surface of this valve when closed and the upper surface of the piston when in its highest position. (See Fig. 2.) The air, which forms a part of the explosive charge, is fed through the passage controlled by this valve to the piston-chamber, the charge of air acting to lift and hold the valve from its seat during its passage and the valve being immediately returned to its seat by its actuating-spring and to be firmly held to its seat by the compression of the charge and its subsequent explosion. The valve is held centrally with its seat by its stem $g^3$, (see Fig. 7,) which is fitted to a hollow boss or sleeve $g$, made integral with the pieces $G^3$, providing the valve-seat, being connected therewith by the arms $g^5$. (This letter is also used to indicate the space between the side arms.) The outside of this sleeve is accurately fitted to and forms the guiding-surface for a second or auxiliary valve $G^4$, which auxiliary valve acts to close the passages I', extending through the valve-seat piece from the exterior of the cylinder F, these passages forming the connection between the cavity or chamber $I^2$ between the cylinder and the case I and which contain compressed air and through which the compressed air is delivered from the compressing-chamber. The auxiliary valve has a slight opening movement which may be unopposed. A further opening movement brings it into contact with the lower end of the valve-spring $g^2$, above referred to, the connection being established by means of a washer surrounding the valve-stem $g^3$ and upon which the said spring $g^2$ directly bears and against which washer the upper end of the tubular extension of the valve $G^4$ strikes on continuation of opening movement.

The auxiliary valve may or may not be operated with every incoming charge of air. Its special and peculiar function is to close the passages $I^2$ upon the occurrence of a heavy pressure in the chamber G'. This chamber is formed in a piece or case G extending from the cylinder F and to the threaded section $F^2$ of which it is firmly attached. The valve-seat piece $G^3$ is held in place between the casing G and the cylinder by means of the end of the cylinder-case, upon which a shouldered portion of the valve-seat piece rests and a shoulder formed upon the side of the case G, which bears upon the upper edge of said shouldered section, the shouldered section of the valve-piece being of the bore of the portion of the case G between its said shoulder and the upper end of the cylinder. One purpose of this last-named construction of chamber and valve is to provide a chamber in which a primary or starting charge is formed and fired and which is of a sufficient capacity to hold enough explosive mixture to produce an explosive effect which shall approximate that of the regularly formed and compressed charge normally fired in the explosive-space H of the cylinder when the engine is running. Upon such primary explosion in the chamber G' the auxiliary valve $G^4$ closes the passages I' and the valve $G^2$ opens, whereby the whole charge passes by the valve into the explosion-space H above the piston, igniting any mixture that may be there and expending itself in driving the piston.

A casing I, made of thin metal, entirely incloses the cylinder and forms the air-space $I^2$, which is used as a passage for the air forced from the lower case, as above mentioned. That the casing I may serve this purpose it is formed with reinforcing-bands $i$ at its upper end, where it fits tightly over the body of the extension-chamber G', and also with the band $i^2$ at its lower end, where it fits over the flange $E^4$ of the case E. There are openings $f'$ through the extreme lower end of the cylinder by which the air enters the space $I^2$ from the compressing-chamber, and other holes are formed through the exhaust-port ring $F^3$, (see Fig. 9,) to be described, for permitting the flow of air from the compressing-chamber to the said chamber G'. There is formed in the walls of the cylinder at a point which is uncovered by the piston near the end of its motive stroke a number of holes $F^4$, forming exhaust-ports for the burned gases. At this point the cylinder is reinforced by a ring $F^3$, (see Fig. 13,) through which the ports are continued to the atmosphere. This ring (shown more plainly in Figs. 9 and 13) interrupts the continuity of the passage $I^2$ aforesaid, but the parts of the casing are shouldered into the ring and provided with reinforcing-bands $i^3$ below and $i^4$ above, and the passage $I^2$ is continued by vertical holes $F^5$ through the ring $F^3$ between the exhaust-ports, as shown in Fig. 9.

Oil in the form of spray mingled with more or less of its vapor and air, upon which it is borne, enter the cylinder at the port L, located sufficiently above the exhaust-ports to provide time for the oil spray, &c., to enter the cylinder after the piston on its upstroke has passed and closed the exhaust-ports, thereby preventing oil from being drawn out unconsumed from them. The vapor entering the cylinder by said port is controlled by a governing mechanism which proportions the amount supplied to the requirements of the engine. A valve $L^6$, suitably operated, prevents the forcing back of the flame into the vapor-supply passage when the piston uncovers its admission-port on the motor stroke, and the construction and operation of this part of the invention will be described later.

The cycle of movement or progressive use of the working fluid in this engine is similar to that of the so-called "Robson" engine, described on page 196 of the *Gas Engine* by Dugald Clerk, London, Longmans, Green & Co., 1894. In this Robson method "gas and air are drawn into the front end of the cylinder during the return stroke of the piston through an automatic valve and at atmospheric pressure. The next out or motive stroke of the piston compresses the mixture in an intermediate chamber, and when the piston is fully out and the exhaust-ports of the cylinder fully open these compressed gases lift a valve leading to the compression-space of the engine, discharging before it the burned gases contained in the cylinder through the exhaust-valve and filling the cylinder and space with the explosive mixture. This reduces the pressure in the intermediate chamber, so that the return stroke of the piston besides compressing the explosive charge in the explosive-space of the cylinder can draw a fresh charge into the intermediate chamber, there to be compressed and used as before."

In my method the means of accomplishing the various steps differ from the Robson, as do also the mechanical devices for accomplishing it, and by my method the air and the fuel are kept separate and the oil is restrained from entering the cylinder until after the air is admitted and has forced from the cylinder the burned gases and also until after the exhaust-ports are closed. This insures that there shall be no loss of fuel. I also ignite the explosive charge automatically by the heat of the compression, which is made high enough—say one hundred pounds to the square inch—to do so, being sufficient when taken in connection with the heat remaining from the previous explosion, and care should be taken to use a spring K that shall be strong enough to store up sufficient power to permit it to effect this degree of compression upon the mixture. The reciprocating parts of the engine should be sufficiently heavy to deliver this stored force at the end of the return stroke of the piston while the compression in the explosion-chamber is going on.

The manner in which the compressed air enters the central case E has been previously described, and this case, with its various extensions hereinafter referred to, is made tight against pressure and corresponds with the intermediate chamber of the Robson structure, and into it air is drawn on the up or return stroke of the piston, and in it and its various ramifications, including the annular passage I² and the extension-chamber G', it is compressed by the motive stroke of the piston. Upon the release through the exhaust-ports of the exploded gases of the previous charge a portion of the burned gases is discharged by its own remaining pressure, and the remainder is discharged almost completely by the inrush of the new charge of air from the said case E and passages, entering the cylinder through the valve G², as above explained. A time is allowed for this discharge and displacement of burned gases by making the length of the cylinder sufficient to permit the piston to overrun the exhaust-ports, and while overrunning and before closing them on the return stroke this displacement takes place, and equilibrium of pressure is restored in the case and cylinder. After the piston on its return stroke has closed the exhaust-ports the oil-admission valve opens and allows an inflow of vapor or spray through the port L. The continued upward movement of the piston closes the oil-inlet (though this port may be placed at any point on the cylinder or so high as not to be closed at all) and compresses the charge, which cannot now escape from the chamber H, and explodes it. At the same time during the said upward stroke fresh air is drawn into the case and passages, as before described, to be in turn compressed and delivered to the cylinder. In this construction it is obvious that the stroke of the piston is not always the same, as where a crank is employed for converting its reciprocating movement into rotary, so that in the event of a smaller charge the piston would make a longer upward throw until stopped by the resistance of the compressed air. The piston always compresses the gas till a substantially uniform terminal compressive pressure is reached, though the piston changes the length of its throw in so doing. This is highly beneficial, as a high terminal pressure always insures a corresponding temperature, by which the explosion of the charge is insured, even though it changes greatly in composition, as falling much below the usual limit of inflammability experienced in engines with other means of ignition.

The oil-supply reservoir C is provided with a filling-valve, a cross-section of the cylindrical body of which is seen at C³, (see Fig. 10,) where the body fits closely in a casting C⁴, reinforcing the shell of the reservoir at this corner. The body of the filling-valve is slightly extended on the side of the machine opposite to that shown and has connected to this extension the filling-tube C², which also serves as an operating-handle. This tube terminates at its outer end in the funnel C', which in the closed and shown position of the valve rests snugly against the under side of the reservoir. The body of the filling-valve has a hole therein (indicated by the dotted lines) concentric on the valve-body, and this central hole has an orifice, also shown dotted, through which when the filling tube and valve are rotated from the position shown in full lines to that shown in dotted lines at right angles thereto the oil-reservoir may be filled when the machine is laid down on its side. The body of the filling-valve C³ has a second passage extending across the filling-valve substantially at right angles to the preceding orifice, and which is marked c⁴, and which when the filling-valve is in the position shown by full lines in the drawings will provide a connection between the oil-chamber and the case M of the spray-making device, near the bottom thereof. The turning of the filling-valve to the filling position closes this connection. The case M of the spray-making device is tubular and extends into the central vertical member A⁴ of the vehicle-frame. It is held in said member by a clamping-ring C⁵, projecting from the corner-casting of the oil-reservoir, said clamping-ring being provided with a clamping-screw for closing the ring.

Oil from the reservoir flows through the passage c⁴ in the valve into the lower part of the case M till its flow is stopped by the surface of the liquid rising above said passage, and thus preventing the return flow of air to the reservoir. By this means this small body of oil is always maintained at the same height and forms the well or fount N, from which portions are taken for the spray.

For the purpose of forming a spray and feeding the oil to the engine compressed air is taken from the case E by means of the pipe $M^2$, one end of which opens into and is attached to the case E and the other end of which is connected with the chamber $N^2$ in the lower part of the stopper N'. This tube is parallel with the brace $A^6$, to which it and its companion tube M' may be brazed. It extends beyond and is curved over the front of the brace $A^6$ and enters the stopper of the spray-case, being firmly fastened into the stopper N' by the screw $m$. (See Fig. 10.) Oil from the fount N is admitted to the chamber $N^2$ through the holes $M^5$ in a valve, the valve being surrounded by a portion of the stopper N', being adapted to be turned therein to bring its holes $M^5$ into connection or line with the holes in the surrounding case of the stopper and being closed by a ball $M^4$, which seats against the upper end of the valve-piece. This valve permits the flow of oil from the well N through the holes $M^5$ into the interior passage $N^2$ and restrains the return flow, and it is here that the air mingles with the oil and picks it up and carries it on to form spray for the engine. Within the spray-case the tube $M^2$ is continued from the passage or chamber $N^2$ upward by a short length, which is also lettered $M^2$ and which is fast to the stopper N' at its lower end, and the upper end of this interior tube $M^2$ is formed into two branches having opposing orifices or outlets $M^3$. (See Fig. 10.)

From what has been said above it will appear that in the normal operation of the engine the pressure of the air in the case E is alternately above and below that of the atmosphere, and these pulsations of pressure are of course participated in by the contents of the tube $M^2$, connected therewith, so that during the period while the pressure in this tube is below the atmosphere air can enter the same through the orifices $M^3$ and also oil from the well N past the valve $M^4$, and during the periods of high pressure the contents of the tube—that is, the oil and air—will be violently ejected through the orifices $M^3$, by which the stream is divided into halves directed against each other, so that the energy of the issuing stream is used and taken up in minutely tearing and mixing its component parts into the form of spray. In the case M, below the spray-making devices, is a partition $m^3$, which divides the interior of the case into the chamber $M^6$ in its upper part and a lower chamber. The tubes M' $M^2$ pass through this partition, and in the remainder of it there is an opening which is adapted to be closed by a valve $m^2$. This valve is centrally guided by the stem $m^4$, which is carried by a sleeve $m^7$, supported by the arms $m^6$, which depend from the said partition $m^3$. The valve is so faced as to shut off and restrain any flow through the upper chamber of the spray-case during the periods of pressure above referred to, which, of course, occur in the chamber $M^6$ as well as in the tube $M^2$, and the valve opens during the periods of light pressure or partial vacuum, being assisted therein by a very light spring on the under side thereof. The central stem $m^4$ of the valve is hollow and its lower edge forms a second valve-seat, which when the main valve is closed shuts upon the cone-valve $m^5$, borne also by the said arm $m^6$. These two valves complement each other and open and shut as one. The object of this double construction of valve is to facilitate the passage of any oil which may condense from the spray in the upper part of the spray-chamber $M^6$ back to the oil-well in the lower chamber, also to assist which the upper valve has an extension in the form of a cup. The spray formed in the spray-chamber escapes during the periods of pressure into the open end of the tube M', (see Fig. 10,) which tube then passes downward through the partition $m^3$ inside the case, also through the stopper N', to which it is fastened by the screw $m'$ and is parallel with the tube $M^2$, to the rear end of the brace $A^6$, where it bends upward and is fastened by a screw to the valve-case O' on the cylinder, into which case it delivers the spray during the periods of pressure set forth.

Surrounding the central part of the engine and outside of the casing I is a second jacket or casing $O^2$, between which and the casing I is an annular passage $o^{12}$ for conveyance of the spray and in which it is subjected to more or less heat radiating from the cylinder and conducted by contact from the exhaust-ring $F^3$, (see Fig. 13,) and this heat converts more or less of the spray into vapor. This casing is composed of an upper rib or flange $o^7$ and the lower reinforcing-rib $i^4$ and the jacket $O^2$. Between the ribs $o^7$ and $i^4$ is a third rib $o^8$, which separates the jacket-space into the parts $o$ and $o^{12}$, and at any convenient point the tube $o'$ connects with the space $o$. To the jacket $O^2$ is fastened by a screw $o^9$ a small dome-shaped valve-case O', into which the spray feed-tube enters and which case opens into the chamber $o^{12}$. The valve-case carries a valve O, which has a long hollow sleeve through which the screw $o^9$ extends, and this sleeve bears in an outer sleeve, forming a part of the valve-case O'. The valve opens with pressure from the tube M' to permit the spray to pass it and closes when the pressure in the chamber $o^{12}$ is greater than the pressure in said tube M', and thus prevents the spray at such times from feeding backward through the tube. The chamber $o^{12}$ is in direct communication with the passage $L^2$ of the governing device, and to which passage most of the spray is delivered. There are in the central partition $o^8$ one or more small holes $o^{10}$, by which a small portion of the spray escapes into the chamber $o$ itself, from which after an exposure to heat longer than that of the spray which passes through the lower chamber it passes into the tube $o'$.

The regulating and timing device for varying the quantity of spray fed to the cylinder and the time of such feeding is represented as embodied in a small cylinder attached to the engine-case near the middle of its length and is shown in Figs. 9 and 13. The device comprises the cylindrical body $L'$, attached by a screw $L^7$ to the engine-cylinder F, the screw screwing into the cylinder and having a thin external nut. This screw also holds by means of a shoulder a short horizontal portpiece $L^8$, in which is the port L. This port connects, as before mentioned, directly with the cylinder-chamber. Around the central portion of this cylindrical body $L'$ is carried an annular passage $L^2$, which is exterior to the plug $L^4$ and is adapted to be closed more or less by it. The plug is reciprocated in the cylindrical bore of the body $L'$ and across the annular passage. Above the plug $L^4$ the interior of the body communicates with the passage L, before described, by means of the short passage $l^5$, which has at its upper end the conical check-valve $L^6$, faced to close the passage $l^5$ upon the occurrence of explosion in the engine and heavy pressure in the port L. This check-valve is carried and centered by wings bearing on the inner surface of the upper part of the body. The lower end of the short passage $l^5$ is closed by the conical timing-valve $L^5$, which is actuated by a reciprocating part of the engine through the rod $L^3$, with which the valve is connected by the pin $l^3$ and the small spring $l'$, and the valve is closed upon the upward movement of the rod $L^3$. The rod $L^3$ has fast to it by a pin $l^2$ a flange $L^9$ of a size to engage the plug $L^4$, above referred to, and push it in its upward stroke as far as the rod may be moved, and the valve $L^5$ is of a size to move the plug $L^4$ down on the downward movement of the said rod $L^3$. The downward extent of movement of the rod $L^3$ at every reciprocation of the engine is enough to carry the plug $L^4$ downward sufficiently to expose the whole of the annular passage $L^2$. The upward stroke of the rod $L^3$ is variable and depends on the extent of the downward throw of the piston of the engine, so the vertical position of the plug and the relation of its upper edge to the opposing face of the passage $L^2$, and therefore the extent of the area opening into such passage, is determined by the extent of the upward throw of the rod, which in turn, as I have said, is dependent upon the downward movement of the piston. Thus for a longer piston-throw the throttling-plug would be moved higher up, thus throttling the passage $L^2$ more, while a shorter piston-throw would throttle the passage less by moving the plug a shorter distance and even to the extent of exposing the whole area of the opening. By this means the amount of spray fed to the cylinder-chamber is varied and determined. It will be seen that the rod $L^3$ has near its upper end an elongated hole $l^4$, through which the pin $l^3$ extends. This is to enable the rod to move to different heights in placing the plug $L^4$ without interfering with the seating of the valve $L^5$. It will also be seen that there is a spring $l$ fast in the lower face of the flange $L^9$, which serves to move the rod $L^3$ down in consonance with the movement of the admission-cam hereinafter described. The spray or vapor thus delivered to the cylinder mingles with the air therein and is compressed and consumed or exploded, as heretofore recited.

It will be observed that the various spray making and delivering devices for the purpose of supplying a new charge to the explosion-space of the engine may be regarded as forming in operation and function a branch of the more direct air-passage $I^2$, leading from the central case to the top of the cylinder. However, the entrance of the vapor is delayed till the exhaust-ports are closed, being held and stored for this time under delivery-pressure in the various passages of the jacket $O^2$, and the volumes of these passages place a limit to the maximum amount of spray held and capable of delivery for any single stroke of the engine. Therefore these volumes should be made great enough to take a charge commensurate with the maximum power to be developed. The spray or oil-vapor taken into the chamber $o$ through the small holes $o^{10}$ (see Fig. 7) passes up the tube $o'$, through a branch tube $o^2$, into a valve-case $o^4$, whence during the periods of high pressure in the spray-making system it passes the check-valve $o^3$ (shown in dotted outline) and by the passage in the branch pipe $o^5$ into a portion $A^8$ of the frame-tubing of the vehicle. The frame-tubing $A^7$ adjoining is, by means of the plugs $a^3$ $a^4$ in the said tubes $A^7$ and $A^8$, respectively, and a closed joint at the bottom of the tube $A^7$, formed in the process of brazing the frame, converted into a reservoir for such spray or vapor, the check-valve preventing its escape therefrom by the passage of the pipe $o^5$. This vapor is stored in the reservoir and used for the purpose of starting the engine and forms a supply for feeding the engine during its first few strokes and until the new spray formed by the starting of the engine has had time to work along to the engine. This charging back and use as a preliminary supply is performed by a flat disk valve P, which has a passage $P^6$ in its lower face adapted to connect when rotated over them the ends of the tubes $o'$ $o^5$, both of which are fast in the cheek or plate $P^2$, forming the lower seat of the valve. The tube $o'$ presents a straight return-passage, and the tube $o^5$ extends over and by the check-valve $o^3$, as represented in Fig. 7— that is, both the tube $o'$ and the tube $o^5$ have extensions which permit them to be used not only for supplying the reservoir, as above specified, but also for delivering its contents when permitted by the valve P. The valve P turns freely between the upper seat P' and the lower seat P² by turning the post P⁵ (seen projecting above the case) by hand. This post passes through the two seat-plates and is the spindle of the valve. While the valve is held in its open position (shown in Fig. 7) by hand, the vapor passes back freely by the passages $o^5$ through the valve-passage and pipe $o'$ to the engine so long as the pressure in the supply-reservoir A⁷ is sufficient to so feed it. When this falls materially below the pressure in the spray-chamber M⁶, the valve O, which has before been restrained from opening much, because its area is less toward the spray-supplying tube M' than toward the passage $o^{12}$, begins to open sufficiently to permit the spray from the spraying-chamber to be fed to the engine. Upon the bottom side of the valve P (see Fig. 11) is formed a narrow chamber P⁷, opening at one end under the bridge of the passage P⁶ and at the other at such a distance that in length it shall span from the tube $o^5$ to the interior of the chamber G' for the purpose of conveying to the chamber G' a small amount of the vapor from the tube $o^5$ during the moment the said passage is connected with both while the valve P is being turned to a position for charging the passage $o^{12}$. By this means I insure a sufficient supply of combustible vapor in the chamber G' to provide an initial or starting explosion. In the normal position of the valve P, which is a half-turn from the charging position represented in Fig. 7, the passages P⁶ P⁷ are opposite the solid faces of the valve-seat and the tubes are opposed by the solid part of the valve, and therefore are not connected. The means for igniting the primary charge or explosion comprise a dome-shaped hole P³ in the valve P, separate and distinct from the passages before mentioned, having a number of filaments of wire or asbestos P⁴ sticking out from the walls thereof, which walls preferably are lined with some non-conducting coating, such as asbestos. This hole P³ is so located in relation to the cavity P⁶ when the latter is in position over the tubes $o'$ $o^5$ to connect them that said hole P³ is within the cavity G', as shown in Figs. 7 and 11. When the valve P is turned to its normal position, the hole P³, with the filaments, comes under a chimney $p^2$, (see Fig. 12,) rising from the valve-seat P', and is then over a shield $p^3$, into which by opening the spring-hung lower side $p^5$ a lighted match $p^6$ (shown largely by dotted outlines in Fig. 12) may be placed, and the flame $p^7$ of this match, urged somewhat by the air entering the holes $p^4$ in the shield, rises through the dome-shaped hole, filling it with flame and igniting the filaments P⁴ therein and escaping by the chimney aforesaid. When the filaments reach a white heat, which they will do in a moment if sufficiently fine, the valve is quickly turned a half-turn and the white-hot filaments brought into the chamber G', thereby exploding the mixed gases contained therein, and which exploded gases then open the valve G², expand in the piston-chamber, and act on the piston, as previously set forth.

I have also provided the engine with a new and useful means or device for stopping its action; and it consists in providing the exploding-chamber of the cylinder with a valve that can be opened from the exterior of the engine and which valve upon being so operated and opened allows of the escape of the explosive charge from the chamber, and this escape-valve may also be used in connection with a receiving-chamber, into which this charge upon the opening of said escape-valve may enter and be saved or held and used afterward upon the next starting of the engine. As the chamber G' may be used for the purpose of the receiving or storage chamber above specified, and as the valve G² may be used for the stopping-valve above specified, I have not shown the engine as provided with a separate stopping-valve and a separate storage-chamber; but I wish it to be understood that the engine may be so provided, if desired.

It is customary to stop this class of engine by turning off the supply of oil, which leaves the engine dead and with no explodible charge, and it has also been customary in starting the engine to work it a few revolutions by hand to accomplish the process of charging, and it is this troublesome act which I desire to avoid. I have adapted the valve G², so that it serves this additional purpose by prolonging its stem $g^3$, (see Fig. 7,) so that its upper or outer end is near a wall of the chamber G', and I have arranged in line therewith a button-headed plunger $p$, held in a hollow boss extending from the casing G, in which it is air-tight, and which is usually free from contact with the said stem of the valve G² and held so by the spring $p'$, and this plunger when pressed down engages through the stem the valve G² and forces it from its seat, permitting the explosive charge in the chamber H to escape therefrom, and if at any time while the engine is running the valve G² is so forced from its seat the explosive charge instead of being compressed and thereby fired in the manner of the preceding ones will escape, and there being no means by which it may be ignited the engine stops.

It will be observed that I have employed in the engine two different methods of forming the primary explosive charge. The first is by introducing a quantity of vapor into the chamber G' from an outside source controlled by the valve P or other suitable valve, and the second method is by saving the last explosive charge prepared by the engine. In engines using some classes of fuel, gas or lighter oils, or which are not expected to stand long idle, the second method may be sufficient in itself; but if the engine is expected to stand long idle or unused or if the fuel employed is such as to condense readily to a liquid form it will be advisable to employ the first method or so much of it as will insure a mixture of explodible vapor immediately around the igniting device. For using oils which are not easily broken up by heat into a permanent vapor it may be necessary before delivering the same to the tube $o'$ for storage to subject the spray to a more intense heat than would be imparted to it in the passage or chamber $o$—such, for instance, as leading it previous to delivery into the tube $o'$ around the hottest part of the engine-cylinder or even through the explosion-space of the cylinder by a suitable pipe or passage, which might be a continuation of the passage of the pipe $o'$. If for any reason the match primary ignition is not desired, the usual spark-making electrical contact-points may be embodied in the valve P in place of the dome-shaped cavity and filaments.

It will be remembered that I have described the piston-rack $J^3$ as reciprocating the gear $J^4$. This gear $J^4$ rotates freely on the main shaft Q of the engine, (see Figs. 2, 6, and 8,) and is provided with ball-bearings at each end carried in the shell $J^5$, which structurally is a part of the gear and running upon cones $k\,k'$, the first of which is forced against a shoulder on said shaft Q and the second of which is screwed against a like shoulder.

I prefer to counterbalance the engine, and I have represented as one means of accomplishing this a weight T, (see Fig. 2,) guided in a tubular shield or case $E^3$ by a friction-wheel $T^2$, carried by the weight and connected with the gear $J^4$ by a rack which meshes into the gear in a manner similar to the piston-rack. At its lower end the weight is guided by a stationary friction-roll $T^3$, turning upon the pivot $T^4$, fast in an extension of the case E, and which is arranged to bear against the back of the rack. As the counterweight meshes into the same gear as the piston, but upon the opposite side, it moves in an opposite direction and has the same extent of motion, and that the balance may be made complete requires only that its weight shall equal the weight of the piston with one-half the weight of the spring K added thereto. The tubular extensions $E'\,E^2$, which are secured to the lower side of the case E, are useful only as shields for the racks of the piston and counterweight, respectively, and are united with each other at their lower ends to stiffen them. Near the end of the shaft Q and screwed tightly against the back of the cone $k'$ is a ratchet-wheel $k^3$. By beveling the corner of the cone-piece $k'$ and also the corner of the ratchet-wheel $k^3$ where they adjoin I form a ball-path which supports, by appropriate balls and a V-shaped bearing grooved on the inside thereof, a gear $J^8$, turning freely thereon. This gear $J^8$ has a lug $J^7$ (see Fig. 6) extending laterally from it, which is adapted to be engaged by a similar lug $J^6$, extending radially from the gear $J^4$. Parallel with the engine-shaft Q and borne at the back end by a boss extending from the case E and at the front end by a spider $Q^4$, screwed fast in the case E by the thread $h$ on its rim, is a second shaft $Q'$, (see Fig. 6,) adapted to turn freely in the said bearings, and which is, under the control of a sheave $D^8$, made fast to the shaft outside of the case E. This shaft supports, by means of an annular ball-bearing in a groove about the flange $R^2$, fast on said shaft, a gear R, in which the exterior bearing $R'$ of the ball-bearing is made and by which the said gear is maintained in the plane of and in mesh with the gear $J^8$ above mentioned. This gear R is extended on its back side to form a case, within which is a strong spiral spring $R^3$, the outer end of which is fastened to said case and the inner end of which is fastened to a hub of the flange $R^2$, fast on the shaft $Q'$. (See Fig. 6.) It will be seen that if the sheave $D^8$ is held from rotating the inner end of the spring $R^3$, being rigidly connected with the sheave by the part $R^2$ and the shaft $Q'$, will be also held stationary and that as the piston reciprocates the gear $J^4$ back and forth the lug $J^6$ will upon the downward movement of the piston engage the lug $J^7$, and will thereupon turn the gear $J^8$ as far as the reciprocating motion of the piston may extend, and as the gear R meshes with the gear $J^8$ the said gear R will be turned an extent corresponding to that of the said gear $J^8$ and at the same time carry the outer end of the spring $R^3$, fastened thereto, with it, and thereby if the inner end is so held wind up the spring and store power therein. It will further be seen that upon the return or upward stroke of the piston the lug $J^6$ is moved by the piston away from the lug $J^7$, and then the latter being free the spring $R^3$ and gear R will return the gear $J^8$ backward to its original position, and with the force stored by or inherent in the said spring.

The engine-shaft is borne in bearings at each end and has fast to its outer end the ratchet-wheel $k^3$ previously alluded to, (see Figs. 2 and 6,) the said wheel being screwed tightly against the cone $k'$, which abuts against a shoulder on the said shaft. The teeth of this ratchet-wheel are faced to turn the shaft in the direction of the return stroke of the engine when engaged by a driving-pawl S, carried by a pin fast in the gear $J^8$, said pawl being so held that it engages a tooth of the ratchet-wheel upon the return movement of the gear $J^8$ and rides over them upon its forward movement. A light spring $s'$ (see Fig. 2) against the pawl may be used for maintaining its engagement with the teeth. It is through this pawl and ratchet-wheel that power is applied from the spring $R^3$ through the gears R $J^8$ to the engine-shaft, and after the said power has been delivered to and stored in the said spring $R^3$ by the motor-stroke through the gears $J^8$ and R, as aforesaid. It is obvious that the amount of force delivered to the main shaft depends upon the spring $R^3$, and it is also obvious that its tension, and therefore force, may be varied by winding it, and this result is accomplished by means of the sheave $D^8$, which is not only adapted to be held stationary, but also to be turned either to wind up the spring, and thereby increase its force or to release it, leaving its inner end free, so that no force whatever is communicated by it to the shaft, and the lug $J^7$ not then following the lug $J^6$ on the return stroke of the engine, but remaining in the position in which it is left by the said lug $J^6$ at the end of its forcing stroke. It is obvious that while the spring is in this unwound condition the engine, including the counterweight and gear $J^4$, may run uninterruptedly and without communicating any power to the engine-shaft and that likewise the engine may run free and uninterrupted in the event of the shaft Q being forcibly restrained from turning, the pawl S then remaining in engagement with the ratchet $k^3$ at the farthest point reached by any preceding stroke and keeping the spring $R^3$ set, supposing that the sheave $D^8$ is not allowed to turn and run the spring down. It is also obvious that the engine-shaft may turn freely in the direction in which it is driven, rotating the ratchet-wheel under the pawl and turning in the bearings of the gears $J^8$ $J^4$, disturbing none of the mechanism described.

As the engine-shaft is directly connected to the axle of the vehicle, the rate of forward rotation of the shaft may be slow. When such is the case, the spring $R^3$ will not have time to fully unwind and expend its force on the shaft before being reset by the next motor-stroke, and as the lug $J^7$ does not follow for a full stroke the absolute time during which the spring is being reset may be small as compared with the time the spring acts to propel the vehicle. It is also obvious that the spring takes up the force of the explosion of the engine, so that it is not felt on the vehicle as a jerky violent impulse, as is common, especially in vehicles whose engines have light fly-wheels. It is also obvious that by this construction I can start up the engine before the vehicle, and thus obtain a prompt starting thereof or a gradual start, as may be desired.

It will be seen that as the forward motion of the vehicle depends upon the amount of propulsive force and as the spring can be varied to deliver any force required through the winding of the sheave I can by winding the same while the vehicle is in motion obtain any degree of vehicle speed required.

The rack $J^3$ is supported at its lower end and kept in engagement with the gear $J^4$ by an antifriction-roll $Q^2$ (see Fig. 6) bearing upon its back. The said roll is supported by an annular ball-bearing upon a hub $Q^3$ on the shaft $Q'$ and so as to turn freely with the rack, and also so as not to impede the turning of the shaft $Q'$. The outside end of the shaft Q (see Fig. 6) is carried by balls running in a shell or case $k^4$, fast in a spider $Q^5$, which is screwed by threads $h'$ in its rim fast to the case. These rolls bear upon a cylindrical portion of the shaft, that a slight endwise movement of the shaft may be permitted, and a spring $k^5$ is carried in a central projection from the web of the ball-case and bears upon the shaft, pressing it with a slight force toward the back of the machine for the purpose of closing and keeping closed the joint formed where the shaft passes from the case E. This joint is formed by a washer $k^2$, composed largely of graphite, carried on the shaft between the flat back of the cone-piece $k$ and the web of the cone-case $U'$, between which and the shaft, otherwise, the air from the case would leak. The cone-case forming the back support for the engine-shaft consists of two principal parts, the shell $U'$, carrying one of the exterior cones of the bearing and provided with the web aforesaid, and also a projecting flange bearing within the case E. The shell has a barrel portion fitting snugly a cylindrical hole in the case. It has threaded into it for the purpose of adjusting the fit of the balls a cap portion $U^2$, carrying a second exterior cone, which forms, with the corresponding portion of the shell, the exterior bearing for the ring of balls $u^2$. This cap $U^2$ has a thin portion projecting inward to hold a felt dust-washer $u'$ in position over the balls and an exterior flange projecting radially beyond the shell $U'$, under the edge of which flange-screws $u$, (see Fig. 6,) seated in the case E, bear and which when screwed out from the case E lock the cap $U^2$ in position in the shell $U'$, which it at the same time locks in position by straining the inside flange of the shell tightly against the inner wall of the case E. Running within the ring of balls $u^2$ and forming the inner member of the bearing is a bushing U, having double cone-surfaces bearing on the balls, whereby it is restrained from moving endwise. The inside of this bushing is a plane cylindrical hole, within which and with its end substantially at the center of the ring of balls the inner end of the engine-shaft is immediately borne. The outer end of the axle V of the driving-wheel is also supported by this bearing, its end extending into the bushing and being substantially opposite the center of the balls. The end is spherical in shape, that it may not disturb the bushing however much it may depart from perfect alinement with the engine-shaft. The bushing U is driven by the pin $U^4$, fast therein and spanned by the slotted end of the engine-shaft. (See Fig. 6.) The bushing has screwed into an extension of its end a ring $U^3$, by which it drives the axle through the medium of a universal joint composed of a ring $v$ and two pins $v'$ at right angles, connecting the said ring one with the screw-ring $U^3$ and the other with the axle V. The opposite end of the axle is supported by a similar spherical portion $V^3$, resting in a similar bushing W, which also has double cones for the ball-track and which bushing is likewise driven through an extension by a universal joint comprising the ring $v^3$ and the pins $v^4$ at right angles to each other. The balls $w^3$, supporting the double-cone bushing W, are disposed in the plane of the framework on that side of the machine and are carried in a case W', which has one of the exterior cones and also a cap $W^2$, which for the purpose of adjustment is screwed therein from the back side and carries the second exterior cone for the balls. The joint-piece $W^3$, uniting the rear diagonal $A^7$ of the frame with the rear horizontal member, both on the rear side of the vehicle, is bored to receive the ball-case W', which is firmly held therein by screws $w$, the heads of which rest on a flange projecting from the cap $W^2$, the screws thus holding the cap, as well as the ball-case, in position. Both the cap $W^2$ and the case W' are provided with radial flanges extending inwardly for holding felt dust-washers $w'$ $w^2$ on each side of the ring of balls. (See Fig. 6.) By this construction the front and back frames are held a constant distance apart, the axle and universal joints acting in the capacity of a through-bolt and the cones guiding the balls serving as flanges to prevent the side displacement of the frames on the said bolt-axle, while at the same time the universal joint and the spherical seating of the axle permit a substantial displacement of one end from alinement without impeding the transmission of power to the wheel and without cramping the wheel. The axle carries by two disk-like arrangements the hub $V^4$ of the driving-wheel, (see Fig. 6,) which, it will be noticed, is slightly larger in interior diameter than the exterior of the washer $U^3$, thereby permitting the same to pass through it. By this means I am enabled after withdrawing the screws $w$, holding the back bearing-case, to screw the threaded ring $U^3$ from the bushing U by the exterior portion $V^2$ of the axle, which commonly forms the step for the rider, and withdraw the axle and rings from the hub of the wheel, the entire back case, balls, and bushing all remaining on the axle and being withdrawn from the frame at the same time.

As a direct means for driving the wheel I form a notch (see Fig. 8) in the hub of the wheel, with which a lug $u^3$ on the bushing engages. This lug by its engagement with the wheel also holds the bushing U from rotation while screwing the threaded ring $U^3$ into the bushing in withdrawing or inserting the axle. As a means for preventing the axle from unscrewing I insert a split pin $v^2$ through it and the hub of the wheel. (See Fig. 6.)

The shape of the spiders $Q^4$ $Q^5$ and means by which they are fastened in the case E may best be seen in Fig. 4. It will be noticed that the centers of the two shafts Q Q' are nearer together than will permit the periphery of each spider to form a full circle, and I therefore remove a curved piece from the rim of each, which permits each to be unscrewed independently of the other. It will be seen that by utilizing these spiders for receiving the threaded ends of the screws $e'$, fastening on the top cap $E^5$ of the case, the making of lugs on the case E is avoided. The joint between the cap and the case should be air-tight. Motion is given the valve-rod $L^3$, which operates the inlet-valve $L^5$ in the gas-supply port, by a lever $h^2$, (see Figs. 5 and 8,) fast on a rock-shaft $h^3$, having a bearing on the rear wall of the case E and the end of which, inside the case, has a lever $h^4$, carrying the cam-roll $h^5$ in a position to be engaged by a cam $h^6$, fast on the sleeve $J^5$ of the gear $J^4$. This cam $h^6$ is so attached to the sleeve and its incline is of such an extent and rise that it causes the rod $L^3$, through the connecting devices, to close the admission-valve $L^5$ on the motor stroke and permit it to open on the return stroke through the co-operation of a spring $l$ as the working face of the piston passes the exhaust-ports of the cylinder. The cam is also so shaped as to cause the rod $L^3$ to push upward the throttling-valve $L^4$ sufficiently to almost completely close the connection to the vapor-supplying passage $L^2$ for the greatest throw or stroke of the piston and to push it up proportionally for the lesser strokes or throws thereof and not to push it up at all for the minimum stroke of the piston and all upon the motor-stroke; and upon the return stroke when the piston passes the exhaust-ports the cam permits the movement of the admission-valve $L^5$ from its seat, which movement continues until the throttling-valve has been moved sufficiently to fully open the passage $L^2$.

The heel-lever D is preferably broadened at its rear end and may have claws for engaging the heel of the shoe of the rider (see Fig. 1) in order that his foot may not slip thereon. This heel-lever controls the operation of the engine and the movement of the wheel, being connected with the engine by the wire cord $D^7$. This cord passes from the lower end of the lever $D^2$ backward on a straight line, thence over the idlers $d^5$ $d^6$ $d^7$ (see Figs. 4 and 8) upon the back of the case E to the sheave $D^8$, fast to the shaft Q', as before described, and the end of the cord, after making several full turns about the sheave, is fastened to it. The cord should be so wound upon the sheave as to cause the spring $R^3$ to be wound up upon depressing the heel plate or lever and by the consequent forward movement of the lower end of the lever $D^2$. The tension of the spring will return the cord and wind it on the sheave when the lever D is allowed to lift.

From the foregoing it will be seen that there is embodied in the invention which has been described means by which the engine may be started without causing the driving-wheel to be actuated and whereby the engine may be set in operation before the machine is mounted or the vehicle started; also, means by which the connection between the engine and the driving-wheel may be established by a device actuated by the foot of the rider; also, that by said device the amount of power delivered to the driving-wheel, and therefore the speed at which it is turned, may be varied at the will of the rider. It will also be seen that there is combined with this means for starting and operating the engine a brake that is adapted to be applied by foot-power and at any time, either with the power upon the driving-wheel or not, also, that this method of operating and controlling the vehicle leaves the hands of the rider free to grasp and use the steering-handle, as in the usual safety-bicycle or other similar machine. This construction of engine and wheel also provides a propelling mechanism entirely inclosed and has no chain, crank, or other moving external parts and the engine or driving mechanism is freely connected with the driving-wheel, so that no ordinary cramping or other common accident will interfere or prevent the delivery of power to the wheel. It will further be seen that the various operative parts of the engine are contained in the frame of the machine and economy in space and weight thereby effected, that the mechanism is so balanced that the machine is not subjected to vibration, that because of the interposition of the spring $R^3$ shocks or abrupt impulses of the explosion are not felt, and that the engine is adapted to be directly started and without the usual preliminary movements. I would further say that the various features of the invention are adapted to other engines and uses, and that I do not, so far as they are concerned, limit the invention to their employment with vehicles. I would further say that while I have shown the invention as applied to a safety-bicycle I do not mean to limit its use to its connection with such a vehicle, as it may be used in connection with a vehicle of any kind.

While in many instances the use of the saved last explosive charge is a good and all-sufficient means for starting and may be applied to existing engines therefor and when so used, I hold, comes within the scope of this invention, still as in many instances it may be desirable to use, as in the present and on account of the more perfect combustion induced thereby, an explosive mixture so dilute as to be exploded with difficulty in the cold uncompressed state in which it exists at the time of starting I prefer to use some vapor from the reservoir to enrich this first charge, and as it is evident that this use of the reservoir-vapor and the auxiliary chamber offer a second good and sufficient means of starting I claim both methods singly, as well as jointly.

The operation of the invention is as follows: The chamber $G'$, provided at the time of stopping with a more or less explodible charge, receives from the reservoir upon turning the valve P a further small charge of vapor enriching that already there. The same motion of the valve brings the filaments which have been previously ignited by a match into the mixture, which thereupon explodes, opens the valve $G^2$, and enters the chamber H, also igniting any residue there may be there remaining from the last unexploded charge and expending themselves in driving the piston down on the first motor-stroke. The aforesaid motion of the valve P also makes the connection by the passage $P^6$ with the reservoir, and a temporary supply of vapor flows therefrom through the tube $o'$, through the passage connecting with the inlet-port L, and into the cylinder, mingling with the air therein, and upon the upward stroke of the piston is exploded, and these charges from the supply-reservoir are used until the engine begins to feed itself with oil, spray, or vapor from its usual source. The valve P between the gas-supply reservoir and the passage $o'$ is then closed and the reservoir gradually recharged. The alternate air compression and exhaust in the case E due to the movement of the piston into and out of the same operates the spraying device by forcing air through the oil and the spray to the inlet L and indirectly to the storage-reservoir $A^7$ and air to the explosion-space H of the cylinder. The exploded charge is exhausted from the cylinder directly into the open air, and the compressed air under pressure enters the cylinder and assists in expulsion of the exploded charge, the air entering the cylinder before the exhaust-ports are covered upon the return stroke of the piston. The air-inlet valve closes by its spring upon the upstroke of the piston, and the spray enters the chamber after the exhaust-ports are covered during the said upward stroke and is combined with the air and exploded as above specified. The air under pressure from the case is supplied the cylinder by a passage extending entirely around the cylinder-case, so that the cylinder-case is enveloped by a cold-air space. The engine is connected with the power-transforming device after it has been started and at any time, and by depressing the heel-lever D and the power is regulated to suit the demands required of it and while the engine is in operation by the same lever. The engine is stopped by allowing a charge to escape from the explosion-space into the receiving-chamber $G'$. The spraying device and oil-reservoir may be differently located and closer to the engine, if desired. The supply of fuel is automatically regulated to the requirements of the work and by the work.

I disclaim any and all matter shown and described herein which has been made the subject-matter of my divisional application filed July 12, 1897, Serial No. 644,177, and claimed therein.

Having thus fully described my invention, I claim and desire to secure by Letters Patent of the United States—

1. In an explosion-engine, the combination of a combustion-chamber H, means of supplying an explosive charge to said chamber, an inlet-valve as $G^2$ normally operated by the pressure of the incoming charge, and a device adapted to be actuated as by hand which device is further adapted upon such actuation to unseat or lift the said valve and permit the escape of said charge.

2. In an explosion-engine, a piston, a combustion-chamber and a valve automatically opening to admit charge to combustion-chamber, means of supplying said charge, and a device adapted to lift the said valve or restrain it from closing and allow escape from the combustion-chamber when said device is so operated.

3. In an explosion-engine, a common chamber as H, means of supplying an explosive charge to said chamber, an inlet-valve as $G^2$ normally operating by the pressure of the incoming charge, and a tappet as $p$ adapted when actuated as by hand to move against the said valve and lift same from its seat for the purpose of releasing said charge.

4. In an explosion-engine, a combustion-chamber as H, means of supplying an explosive charge to said chamber and an inlet-valve as $G^2$ normally operated by the pressure of the incoming charge and adapted as by means of an extension of its stem to be forced from its seat by the operation of a tappet as $p$, for the purpose of releasing said charge.

5. In an explosion-engine, a combustion-chamber as H, means of supplying an explosive charge to said chamber, an inlet-valve as $G^2$ normally operated by the pressure of the incoming charge, and a device adapted to be actuated as by hand to unseat or lift the said valve and a chamber as $G'$ into which the said charge may escape upon such actuation of the said device.

6. The combination in an explosion-engine, of a cylinder-chamber having an explosion-space H, the auxiliary chamber as $G'$ with which it is connected by relatively large opening, the valve $G^2$ for automatically opening and closing the said passage, movable toward or into the chamber H to open said passage, the said valve also adapted to close the said passage and resist the action of the explosive charge in the chamber H, and a device which is adapted to be actuated as by hand for opening the said valve, as and for the purposes described.

7. The combination in an explosive-engine, of the cylinder having the explosion-space H and the auxiliary chamber $G'$ both extending integrally in one structure, means of causing an explosion in the said auxiliary chamber, a large opening connecting the two chambers, a valve as $G^2$ for opening and closing the said opening opposed to the explosion of the charge in the chamber H, and opening to the explosion of the charge in the chamber $G'$, the whole being adapted for the purpose of starting the engine.

8. The combination in an explosion-engine, of the piston-chamber having the section H, an opening therefrom, the valve $G^2$ for opening and closing the same, the spring $g^2$ for automatically closing said valve and holding it closed, the valve-stem $g^3$ and a tappet or similar device having an external section adapted to be moved by hand and adapted, upon its inward movement, to be moved against the valve-spindle to move the same to open the valve, and a spring for holding the tappet removed from the spindle.

9. The combination in an explosion-engine of the combustion-chamber as H, the chamber $G'$ extending integrally in one structure therewith and means of igniting an explosion therein, the passage from the combustion-chamber to the chamber $G'$ by which an unexploded charge may be released and a valve for opening and closing the said passage, the said valve being automatically opened upon the explosion in said chamber $G'$.

10. The combination in an explosion-engine, of the chamber H, a passage therefrom, the chamber $G'$, the valve $G^2$ automatically actuated by variations in pressure as specified, and a device for opening said valve by hand at any desired time, as and for the purposes set forth.

11. The combination in an explosion-engine of the combustion-chamber as H, a chamber as $G'$, a valve adapted to open inwardly into the said combustion-chamber automatically by pressure and a device to open the said valve when actuated as by hand.

12. The combination in an explosion-engine of the section H, of the piston-chamber, the chamber $G'$, the passage $g^5$, the air-inlets $I'$, the valve $G^2$ opening and closing the said passage $g^5$ and the valve $G^4$ opening the said passages $I'$, as and for the purposes described.

13. The combination in an explosion-chamber, of the piston-chamber having the section H, the chamber $G'$, a passage connecting the two chambers, the valve $G^2$ for opening and closing said passage, the inlets $I'$, the valve $G^4$ and the spring $g^2$ common to both valves and adapted to close each or assist in closing them.

14. The combination in an explosion-engine of the section H of the piston-chamber, the chamber $G'$, the connecting-passage, the ports $I'$, the valve $G^4$, the piece $G^3$ having seats for the valve $G^2$ and the valve $G^4$, a support or sleeve $g$ carried by said seat-piece $G^3$, the valve-spindle $g^3$ supported thereby and movable therein, the valve-sleeve supported thereby and movable thereon and connected with the valve $G^4$ and suitable valve-closing spring or springs.

15. The combination in an explosion-engine of the piston-chamber having the extension H, the auxiliary chamber $G'$ opening into the chamber H, an automatically-acting valve between the two, a reservoir, vapor or gas holding device adapted to be charged during the operation of the engine connected with said chamber $G'$ and adapted to provide it with preliminary explodible charges in starting the engine, as and for the purposes described.

16. The combination in an explosion-engine of the extension H of the piston-chamber, the chamber $G'$ connected therewith, a valve between the two actuated as specified, a holder or reservoir for holding explodible gas or vapor under pressure connected with said chamber G' and a valve between the two, the movement of which connects and closes the connection between the reservoir and the said chamber G' admitting during its turning to said chamber an explodible charge, as and for the purposes described.

17. The combination in an explosion-engine of the auxiliary chamber formed structurally integral with the cylinder for receiving and holding a preliminary charge, means within said auxiliary chamber for igniting said preliminary charge and a reservoir for furnishing gas for the said charge, the said reservoir adapted to be recharged by and during the operation of the engine.

18. The combination in an explosion-engine of the piston-chamber having the extension H, the auxiliary chamber G' connected with the piston-chamber, a valve between the two, a reservoir for holding gas or vapor under pressure adapted to be charged by and during the operation of the engine, the said reservoir connected with the piston-chamber and the said chamber G', the piston J' in the piston-chamber, and means for opening and closing the connection between the said reservoir and piston-chamber and the said reservoir and chamber G'.

19. The combination in an explosion-engine of the piston-chamber having the extension H, the chamber G' connected with the piston-chamber, a valve between the two operated as specified, a reservoir or holder for holding gas or vapor under pressure connected with the piston-chamber and with the chamber G' and a valve for opening and closing the connection between the said reservoir and the piston-chamber which is constructed to open and close a passage to the chamber G' during its opening movement, as and for the purposes described.

20. The combination in an explosion-engine, of the piston-chamber having an extension H, the auxiliary chamber G' connected with the piston-chamber, a valve between the two actuated as specified, a reservoir or holder for holding gas or vapor under pressure connected with the main gas or vapor supply, whereby it is adapted to be charged with vapor or gas during the operation of the engine, a check-valve in the connection opening with the supplying-pressure and closing against the pressure of the gas or vapor in the reservoir, and a connection between the said reservoir and the piston-chamber and the chamber G' and means for opening and closing said connection, as and for the purposes described.

21. In an explosion-engine provided with a cylinder having an extension H, an auxiliary chamber as G', a reservoir or holder connected with the gas or vapor supply adapted to be charged with combustible gas by and during the ordinary running of the engine, and further adapted to recharge the said auxiliary and the said piston chambers both or one of them at the time of starting.

22. In an explosion-engine having the usual combustion-chamber and an auxiliary chamber, as G', a reservoir or holder connected with the gas or vapor supply and adapted to be charged by and during the operation of the engine with combustible gas, and connected with the said auxiliary and the said piston chambers and means for forming and closing the connection of said reservoir or holder with said chambers at the time of starting.

23. In an explosion-engine provided with a cylinder having an extension H, an auxiliary chamber as G', a reservoir or holder connected with the gas or vapor supply adapted to be charged by and during the ordinary running of the engine, means for converting the vapor into more or less fixed gas, and said reservoir further adapted to recharge the said auxiliary and the said piston chambers both or one of them at the time of starting.

24. The combination in an explosion-engine of the cylinder-case subject to more or less of the heat of the explosion, the said case containing passages adapted to expose vapors traversing the same to the heat of the case, means of causing the vapor or spray to traverse the said passage in passing to a reservoir whereby they are converted in whole or in part into gas and the reservoir wherein they are stored, as and for the purposes described.

25. The combination in an explosion-engine of the piston-chamber having an extension H, the vapor or spray inlet L, the passage $o'$, $o^2$, $o^5$, the reservoir or holder $A^7$, the check-valve $o^3$, and the valve P, as and for the purposes described.

26. The combination in a gas-engine of an auxiliary chamber adapted to hold an explodible charge, with an igniting device movable into and out of said chamber, means without said chamber for heating or igniting said device by a lighted match or other instrumentality inserted into a chamber $p^3$, the draft-passage extending from said chamber, the igniting device having the hole $P^3$ and being adapted to be moved from said heating-chamber to the explosion-chamber, as and for the purposes described.

27. The combination in a gas-engine of an auxiliary or other combustion-chamber adapted to hold an explosive charge, an igniting device having small filaments readily heated to incandescence, a chamber as $p^3$ near the explosion-chamber adapted by draft devices to hold a burning match for heating the filaments, the said igniting device adapted to move so as to bring the incandescent filaments within the said explosion-chamber.

28. The combination in an explosion-engine of the piston-chamber, an auxiliary chamber G' connected therewith, an intermediate valve, a reservoir for holding gas or vapor under continuous pressure, connections between said reservoir, the piston-chamber and the chamber G', a chamber in which an igniting device is adapted to be heated or fired, and a rotary valve carrying said igniting device and also having passages in continuation of the passages connecting the said reservoir with the piston-chamber and said reservoir with the chamber G', whereby upon the turning of said valve in one direction connection is established between the reservoir and the piston-chamber, a temporary connection established and closed between said reservoir and a chamber G' and the igniting device moved in the chamber G' to explode the charge therein, as and for the purposes described.

29. The combination in an explosion-engine of the piston-chamber, an auxiliary chamber G' connected therewith, an intermediate valve, a reservoir for holding gas or vapor under continuous pressure, connections between said reservoir, the piston-chamber and the chamber G', a chamber in which an igniting device is adapted to be heated or fired, and a rotary valve carrying said igniting device and also having passages in continuation of the passages connecting the said reservoir with the chamber G', whereby upon the turning of said valve in one direction connection is established between the reservoir and the piston-chamber a temporary connection established and closed between said reservoir and the chamber G' and the igniting device moved in the chamber G' to explode the charge therein, and whereby upon the reverse movement of said valve the said passage between the reservoir and the piston-chamber is closed and the said ignition device returned to its heating or firing chamber, as and for the purposes described.

30. The combination in an explosion-engine of the piston-chamber having the section H, the valve $G^2$, the air-inlets I', the case E into and out of which the piston is moved, connected with a source of air-supply and also connected by the chamber $I^2$ surrounding the cylinder with the said ports I', as and for the purposes set forth.

31. The combination in an explosion-engine of the piston-chamber having the extension H, the chamber G' connected therewith, an intermediate valve $G^2$ operating as specified, the chamber in the case E connected with the outer air and also with the chamber G', the valve $G^4$ closing said connection upon the explosion of gases in the chamber G', as and for the purposes described.

32. The combination in an explosion-engine of the piston-chamber having the extension H, an air-passage entering said extension, a valve for closing the same, the exhaust-ports $F^4$, the gas or vapor inlet port L and the piston J', all arranged in relation to each other and operating as described.

33. The combination in an explosion-engine of the piston-chamber having the extension H, the air-inlet thereto, the inlet-controlling valve, the spray or vapor inlet L located as specified, the exhaust-ports $F^4$, the piston J', the said air-valve being opened immediately after the explosion in the chamber H during the downward movement of the piston J' and the said downward movement of the piston opening the exhaust-ports $F^4$ and the spray or gas port L being opened after the said exhaust-ports are closed upon the upward movement of the piston and the spray or vapor entering said piston-chamber until the upper end of the piston passes said port L, thereby closing it and stopping the inflow when said vapor or spray thus admitted is compressed with the air admitted from the air-inlet, and until exploded in the extension H upon the end of the upward movement of the piston.

34. The combination in an explosion-engine of the piston-chamber, the port L through which the spray, gas, vapor or oil is fed to the engine, the connection with the spray-forming devices and means for regulating the time and volume of the vapor or spray supply, comprising the valve $L^5$ actuated as specified, the channel $L^2$ and the sleeve $L^4$ actuated as described.

35. The combination in an explosion-engine of the port L, a passage connecting it with the spray, vapor or oil supply, a check-valve closing with the pressure from the piston-chamber and opening to the feed-pressure, a valve $L^5$ connected and operated with the moving part of the engine through the valve-rod $L^3$, the spring $l'$, the sleeve $L^4$, the channel $L^2$, the piece $L^9$ attached to the spindle $L^3$ and the spring $l$, as and for the purposes described.

36. The combination in an explosion-engine of the piston-chamber having an extension H, the air-inlet thereto, a valve for opening and closing the same, the spray-port L, means for varying the time and volume of the spray, gas or oil fed through the same, the spraying device connected with the port L, the chamber in the case E connected with said spraying device and with the piston extension H and with the outer air, the piston J' movable into said chamber, whereby upon the motor stroke air is compressed in said chamber and forced through the spraying device to feed the oil in the form of spray to the inlet L and also forcing air directly into the chamber H, and whereby upon the return stroke of the piston air is drawn into the chamber of said case, and suitable check-valves for closing the inlets to the piston and for closing the connections between the chamber of the case E and the spraying device, whereby air is drawn into said chamber only from the air-supply passage thereof, as and for the purposes set forth.

37. The combination in an explosion-engine of the case E having a chamber in which air is compressed by the movement of the piston into the same, with a spraying device, a pipe $M^2$ having a passage connecting the said case with the spraying device and a pipe M' connecting said spraying device with the inlet-port L, as and for the purposes described.

38. The combination of the spray-supply passage, the chamber about the cylinder divided by the partition $o^8$ into the two sections $o$, $o^{12}$, the part $o^{12}$ being connected with the inlet-port L and the part $o$ being connected by means of the pipe $o'$ with a storage reservoir or holder, and small passages between the two sections $o^{12}$, $o$.

39. The combination in an explosion-engine of an oil-reservoir, an oil-holder N connected with the reservoir and constantly supplied with oil therefrom, an air-supply passage extending through this oil-holder and connected therewith by means on the inlet-hole $M^5$ and the valve $M^4$, the spraying device $M^3$ and the spray-feeding passage M', as and for the purposes set forth.

40. The combination in an explosion-engine of the case holding at its lower end a body of oil and a passage extending through the same having the inlet $M^5$ and the valve $M^4$, in combination with means for varying the pressure in said passage, as and for the purposes described.

41. The combination in an explosion-engine of an oil-supply, a passage extending through it connected therewith as specified, a spraying device at the end of said passage, the said spraying device being located over the said body of oil, and an interposed valve below the spraying device and between it and the body of oil, as and for the purposes described.

42. The combination in an explosion-engine of the case adapted to contain a body of oil, a passage through the same connected with the oil-supply as specified, the spraying device and a valve beneath the spraying device between it and the body of oil, having the relatively large head $m^2$ which closes upon the stationary seat $m^5$, all as and for the purposes set forth.

43. The combination of the oil-reservoir with a valve provided with a hollow handle having a funnel extension, and the movement of which handle in one direction opens the valve and permits the reservoir to be filled, while the movement thereof in the opposite direction closes the valve and removes it to a position alongside the reservoir.

44. The combination of the oil-reservoir, the spraying device, a connecting passage and a valve through which oil is adapted to be supplied to the reservoir, and which also connects the reservoir with said spraying device, adapted upon its movement in one direction, to close the said passage to the spraying device and open the oil-supply passage, and upon its movement in a reverse direction to open the passage to said spraying device and close the oil-supply passage, as and for the purposes set forth.

45. In an explosion-engine organized with means of accomplishing both its forward and its return stroke, a piston, and a spring separate and distinct from the aforesaid means, adapted to be wound or compressed by the engine upon one stroke of the piston and upon the other stroke of the piston to be free therefrom and to deliver the power thus supplied it to an instrumentality.

46. In an explosion-engine with means of accomplishing the forward and return stroke of its piston, a spring having an operative end adapted to actuate an instrumentality, the said operative end to be compressed by one stroke of the piston and further adapted, upon the reverse stroke of the piston, to be free therefrom and free to deliver the power thus supplied it to the said instrumentality.

47. In an explosion-engine organized with means of accomplishing both the forward and return strokes of the piston, a spring, one of whose operative ends is adapted to actuate an instrumentality, the same end of the said spring being further adapted to be compressed by one stroke of the piston and be free from the said piston on the reverse stroke of the same and the said spring being further adapted upon such release of its operative end from the constraint of the aforesaid piston to be free to deliver the power stored therein to the said instrumentality.

48. The combination of a spring adapted to receive compressive impulses in one direction and adapted to and connected by means, as of a ratchet with a shaft to rotate it in one direction, and upon the recoil from such compressive impulses, the said means adapted to disconnect from the shaft upon the compressive impulses and when the spring is moved in that direction, an automatic engine separate and distinct from the aforesaid spring adapted to compress the said spring and alternately to release it and an instrumentality adapted to be driven by said shaft.

49. In an explosion-engine, a gear as $J^8$ carrying a lug finger or abutment in the path of motion of a lug, finger or abutment attached or connected by mechanism to and receiving motion from the piston whereby the piston may communicate motion to said gear upon one stroke and automatically release therefrom and be free to leave said lug or gear upon the reverse stroke, a spring as of a spring-motor connected with the gear $J^8$ and adapted to be compressed thereby, as an improved mechanism for compressing and releasing the said spring.

50. In an explosion-engine, the combination of the piston provided with means to make the complete forward-and-back reciprocating movement thereof, a spring adapted to be wound and compressed upon one stroke of the piston, and be freed therefrom on the other, a driving-wheel, means connecting the spring therewith whereby, upon the release of the said spring from the constraint of the said piston the power of the spring is transmitted to the wheel for the purpose described.

51. In a vehicle, the combination of an engine provided with means for automatically continuing in motion, with a spring adapted to receive compressive impulses from said engine and alternately to be released therefrom and further adapted during such periods of release to apply its force to the propulsion of the said vehicle.

52. The combination in an explosion-engine of the piston and means substantially as specified for reciprocating it, a gear J⁴, a rack connecting same with said piston, a gear J⁸ connected with the gear J⁴ as specified, a gear R with which the gear J⁸ engages, and which is connected with a coiled spring, one end of which is fast and the other end of which is attached to driving-pawl S upon the gear J⁸, a ratchet-wheel upon the engine-shaft, whereby upon the motive stroke of the piston the coiled spring is wound by the turning of the gears J⁴, J⁸, and R in a direction to wind up the spring, and whereby upon the reverse stroke of the piston the gear J⁴ is moved backward thereby permitting the spring to actuate through the gear R and the gear J⁸ the driving-pawl S which then makes engagement with the ratchet-wheel, as and for the purposes described.

53. The combination in an explosion-engine of the piston J' connected with the gear-wheel J⁴ as specified, the gear J⁸ connected with the wheel J⁴ to be moved thereby during the motive stroke of the piston and to be disconnected therefrom during the reverse stroke of the piston, a coiled power-transforming spring wound by said gear J⁸ during its engagement with the gear J⁴, and a device connecting said gear J⁸ with the engine-shaft upon a reverse movement of the gear J⁸, as and for the purposes described.

54. The combination in an explosion engine of the piston and means for actuating it upon the forward and upon the return strokes, a coiled spring separate and distinct from said means, adapted to be wound during the motive stroke of the piston and connected with the engine-shaft during the reverse stroke of the piston whereby its power is delivered thereto independently of the piston and means for varying the tension of the spring while in action.

55. In a vehicle adapted to be propelled by an explosion-engine, a holder or reservoir for containing gas or vapor under pressure formed by or held in a portion of the frame of the vehicle and connected with the engine.

56. The combination of a driving wheel or wheels of a vehicle with a spring-motor the driving power of which is communicated to said wheel or wheels, and an automatic engine provided with means for accomplishing both its strokes said means separate and distinct from the said spring of said motor, the said engine adapted to connect with and wind or compress the spring of the spring-motor after each delivery of the energy of the spring to the said wheels, and to disconnect from the spring-motor after making such spring-compressive stroke.

57. In an automobile vehicle, the combination of an engine provided with means for automatically developing power, a lug as J⁶ adapted to receive power from the engine and apply it to a storage-spring, as R³, which is independent or separate from said means, and said independent storage-spring adapted upon the recession or reverse movement of the lug to drive a shaft by means, as a ratchet or pawl or equivalent mechanism, and said shaft and ratchet and pawl.

58. In an automobile vehicle, the combination of a continuously-running engine, a spring connected with said engine to be compressed thereby upon its movement in one direction and to be released therefrom upon its movement in a reverse direction, the said spring, a ratchet-and-pawl or equivalent mechanism to transfer the power of the spring to a driving-shaft and operate to turn it in one direction, and the said driving-shaft all combined and arranged whereby the engine may run continuously after such compression and the spring remain so compressed till the shaft turns or is allowed to turn and whereby also the shaft is free to turn independent of the action of the engine.

59. The combination of the driving wheel or wheels of a vehicle, the piston of an engine, means for accomplishing both the forward and return strokes of said piston, a spring, one end of which receives the pressure impulses from the piston or from mechanism operated by said piston, and which same operative end of said spring is also connected with mechanism by which the recoil of the said spring is delivered to said driving-wheel or driving-wheels.

60. The combination of the driving wheel or wheels of a vehicle, the piston of an engine, means for accomplishing both the forward and return strokes of the said piston, a spring one end of which receives the pressure impulses from the piston or from mechanism operated by said piston, and which same operative end of said spring is also connected with mechanism by which the recoil of the said spring is delivered to said driving-wheel or driving-wheels, and the other end of said spring being for this purpose substantially fixed.

61. The combination of the driving wheel or wheels of a vehicle with a spring, one end of which is connected with the mechanism adapted to receive impulses from the engine and which mechanism acts to compress the spring when so impelled, the said mechanism also being adapted to receive the stored-up power of the spring and transmit it to the said driving wheel or wheels and means for varying the power of the spring while in action.

62. In an automobile vehicle the combination of the driving wheel or wheels with a spring, one end of which is relatively fixed and the other end of which is connected with mechanism adapted to receive impulses from an engine and which mechanism acts to compress the spring when so impelled; the said mechanism also acting to receive the stored-up power of the spring and transmit it to the said driving wheel or wheels and the automatic engine having means separate and distinct from any of the aforesaid for the continuous development power.

63. The combination of the driving wheel or wheels of a vehicle with a spring, one end of which is connected with mechanism adapted to receive impulses from the engine and which mechanism acts to compress the spring when so impelled; the said mechanism also adapted to receive the stored-up power of the spring, and a mechanism, as a ratchet and pawl, for making connection to the shaft when the said first-mentioned mechanism turns one way, and unmaking it while the spring is being compressed, and an engine provided with automatic means for continuously running separate and distinct from the said spring.

64. The combination of the driving wheel or wheels of a vehicle with a spring, one end of which is connected with the mechanism adapted to receive impulses from the engine and which mechanism acts to compress the spring when so impelled; the said mechanism also adapted to receive the stored-up power of the spring, and a mechanism, as a ratchet and pawl, for making connection to the shaft when the said first-mentioned mechanism turns one way and unmaking it while the spring is being compressed and an engine provided with automatic means for continuously running separate and distinct from the said spring, and means for varying the power of the spring while in use.

65. The combination of the driving wheel or wheels of a vehicle, a spring, one end of which is connected with the said driving wheel or wheels to turn the same, and the other end of which is adapted to be moved during the action of the spring to vary the force thereof, and during its action by the operator or rider of the vehicle.

66. The combination of a spring, an explosion-engine for storing power therein, a driving-wheel to which said spring delivers its stored power and means for varying the tension of the spring while in action, comprising a shaft, to the inner end of which an end of said spring is fixed, and means within the control of the operator or rider of said vehicle for turning said shaft at will and holding it in the position to which it may have been turned.

67. The combination of the driving-wheel of a vehicle, a spring-motor, an engine connected with said spring-motor to deliver compressive impulses thereto, means connecting said spring with the driving-wheel of the vehicle, whereby its stored energy is transmitted to said wheel between said impulses, and means for changing or varying the tension of said spring while in action, and a pedal connected with said means.

68. The combination of the driving-wheel of a vehicle, a spring-motor connected therewith to propel it, means for starting the motor and regulating the amount of power delivered by it to the driving-wheel, a pedal connected with said regulating mechanism and an engine adapted to furnish power to the spring-motor.

69. In a vehicle, the combination of the driving-wheel, an engine, a spring-motor adapted to receive compressive impulses therefrom and also connected to the said wheel to propel it, means for starting the motor and regulating the amount of power delivered to it by the driving-wheel, a pedal connected with the said regulating mechanism, a brake to act against said driving-wheel and a foot-lever connected with said brake.

70. The combination of a driving-wheel, an engine, a spring-motor adapted to receive power therefrom and connected with a wheel of the vehicle; a pedal D connected with the motor and the brake-lever D' so located as to be actuated by a foot of the rider of the vehicle.

71. The combination of the rear strut of the frame A⁵, the joint-piece B for uniting it with other portions of the frame, an explosion-engine carried upon joint-piece B and an air-passage extending from the engine through the said strut A⁵.

72. The combination of the case M containing spray-making devices, with the hollow section A⁴ of the vehicle-frame in which said case is in whole or in part contained.

73. In an explosion-engine in which the length of the stroke of the piston depends upon the power of the explosion, a valve admitting combustible vapor to the engine, the opening of which is reset for each stroke and in inverse proportion to the length of the stroke of the piston of the engine.

74. The combination of the vehicle-frame, a motor carried thereby connected with an axle of the driving-wheel a flexible axle forming a connection between the wheel and the engine-shaft.

75. The combination of the vehicle-frame, the driving-wheel, the motor, its shaft Q, the axle of the driving-wheel connected with the shaft Q, as specified, and the jointed outer bearing for said axle, as and for the purposes described.

76. The combination in a vehicle of the section A⁶ of the frame, the motor attached thereto, the section A⁷ of the frame, the wheel-bearing described carried thereby, the driving-wheel and the driving-axle formed as specified, and connected with the motor-shaft and with the bearings carried by the frame A⁷, as described.

77. The combination of the vehicle-frame, the motor carried by one section thereof, a bearing carried by the other section thereof, a driving-wheel having its axle interposed between the driving-shaft of the motor and the said bearing, the said axle being connected with the said driving-shaft by a universal joint, and being also connected with the part W by a universal joint, as and for the purposes described.

78. The combination of the motor-shaft Q, the bushing U, the wheel-hub V⁴ connected with the bushing by the lug $u^3$, all as and for the purposes set forth.

79. In a bicycle, the combination of the frame, the driving-wheel and a motor, of the character specified, operated by an explosion-engine connected with said wheel, said engine and means for stopping or regulating the motor without stopping the engine.

80. In a vehicle, the combination of the frame of the machine, a driving-wheel, an engine, a spring-power transformer actuated thereby connected with the driving-wheel, means for varying or stopping the operative power of the said transformer without stopping the engine.

81. In a vehicle, the combination of the frame of the machine, a driving-wheel, a spring-power transformer connected therewith, an explosive-engine for actuating the said transformer and means for stopping the engine by removing therefrom its explosive charge adapted to be actuated by the rider of the machine while the machine is in motion, whereby the action of the machine may be stopped.

82. The combinations of the ball-rings $u^2$, $w^3$, in the plane of the sections $A^5$, $A^7$ of the frame, respectively, the bushings U, W, supported thereby, the axle having the rounded or spherical ends contained in said bushings and universal or substantially universal joints connecting the said bushings with the axle.

83. The combination in a vehicle, of the section $A^3$ of its frame, the oil-reservoir C carried thereby, the section $A^4$ of the frame having a cavity containing the spraying device, a hollow section upon its top and forming an air-supply passage to the case E, the section $A^7$ of the frame supporting with the section $A^5$ the axle of the wheel, an explosion-engine attached to the section $A^5$ of the frame and connected with the spraying device, as described, as and for the purposes set forth.

84. The combination of the section $A^7$ of the frame having in its lower end a circular hole and an annular flange at one end thereof, a case W' contained in said hole, the cap-plate $W^2$ screwing into said case and fastened to the frame $A^7$ as specified, the bearings for the balls $w^3$ formed by the cap-plate and case as described, and the hollow bushing W supporting and connected with one end of the axle, as and for the purposes set forth.

85. The combination of the case E, the spiders $Q^4$, $Q^5$ united to the case as described, the shaft Q' supported by the spider and by the inner side of the case, the bearing $R^2$ fastened to said shaft and providing a support for a ring of balls, its hub to which the inner end of a coiled spring is secured, the gear R mounted upon the said ring of balls, to the inner face of which the outer end of said coiled spring is secured, the engine-shaft supported at one end by the spider $Q^5$ and at its other end by the case and the case-cap $E^5$, as and for the purposes set forth.

86. The combination of the case with the removable spiders $Q^4$, $Q^5$, one of which supports one end of the shaft Q', and the other of which supports the front end of the axle-shaft Q, and which spiders have curved sections removed from their outer edges, whereby each may be turned in the case independently of the other, as and for the purposes described.

87. The combination of the case E, the spider $Q^5$ screwed into it, the ball-case carried by said spider and balls mounted therein supporting the end of the engine-shaft, the case U', its cap $U^2$, the balls $u^2$ carried thereby, the cap and case being united to the case E as specified, the bushing U connected with the engine-shaft and providing a bearing for the end of the wheel-axle, all as and for the purposes set forth.

88. The combination of the case U' having an inner flange to lap upon the inner surface of the case, also having a hole through which the engine-shaft extends, the compressible washer $k^2$ about the engine-shaft, the bearing for the gear $J^4$ formed by the screw-sleeve $k$ to be screwed upon the engine-shaft against a shoulder, and the sleeve $k'$ which is held against a shoulder of the shaft by the ratchet-wheel $k^3$, a barrel $J^5$ having opposed angle-pieces between which and the sleeves $k$, $k'$ are the rings of bearing-balls, the ratchet-wheel $k^3$ and the spring $k^5$ to bear against the end of the engine-shaft and press it inward, as and for the purposes described.

89. The combination in an explosion-engine, of the cylinder F having an extension H, a piston, an air-tight case containing the spring-power transformer in which the piston is moved, and which case has a connection with the outer air closed by a check-valve, a spray device with which the cavity of said case is connected, and a passage between said air-tight case and the extension H of the cylinder, whereby the movement of the piston into the case compresses air therein and causes air under pressure to be forced through the spraying devices and also to the upper end of the piston-chamber and the reversed movement of which piston causes air to be drawn into said case.

90. The combination of the cylinder forming a piston-chamber, an explosion-space H, the air-inlet, spray-inlet and exhaust-ports thereof, the piston J' tightly fitting in the chamber, the air-tight case E containing the motor connected with the piston-chamber, the piston-spring K, the rack $J^6$ connected with the piston and engaging the gear $J^4$.

91. The combination of the spring-holder, the shaft Q' to which its inner end is attached, the sheave $D^8$ and the cord $D^7$ attached to the sheave.

92. The combination of the frame-sections $A^5$, $A^6$, their connecting joint-piece and the engine-casing connected to said joint-piece by screws, the joint-piece and casing being formed as specified.

93. The combination of the case E, its extension E' and the case E², E³, the sections E', E² being united together at their lower ends and opening into the chamber of the case E.

94. In a vehicle, the combination of the case E, the chamber therein, the piston, the air-supply passage contained in a portion of the frame of the vehicle, the joint-piece B uniting the contiguous portions of the frame and adapted to pass air to the case E, and a valve as B' in the said joint-piece.

95. The combination of the frame-section A⁴ having a cavity, the spray-case M inserted into said cavity and a clamp attached to the lower end of the reservoir, shell or base to engage said case and hold it in said cavity.

96. In an automobile vehicle, the combination of the piston, means for reciprocating the same, a spring separate and distinct from the said means adapted to be wound or compressed by one stroke of the piston, the driving-wheel of the vehicle and means connecting the spring therewith whereby upon the release of the spring from the piston the power of the spring is transmitted to the said driving-wheel, as and for the purposes described.

97. In an automobile vehicle, the combination of the piston, means for reciprocating the same, a spring separate and distinct from the said means adapted to be engaged by the piston and released from its connection to the driving-wheel and further to be wound or compressed by the one stroke of the piston, the driving-wheel of the vehicle and means connecting the spring therewith, whereby, upon the release of the spring from the piston, the power of the spring is transmitted to the said driving-wheel, as and for the purposes described.

98. In a free-piston engine, a piston, a valve adapted when given varying extents of throw to apportion the charges of vapor for combustion, a cam constructed as specified, means connecting the said cam and the said valve, and means connecting the said cam and said piston whereby the valve is given an amount of throw proportioned to the throw of the piston and construction of cam.

99. In a vehicle having a frame on each side of the wheel, a support for the wheel consisting of rings of balls held substantially in the plane of the frame and restrained from lateral displacement by the flanges of the exterior ball-cases and the inner members running on the lines of balls having flanges on each side of the balls, whereby each of said inner members is fixed laterally in relation to its outer member and to its frame, and a through connection within the rear wheel reaching from one inner member on one side to the inner member on the other side for the purpose of maintaining the proper distance apart of the two frames while permitting the rotation of the cross connection.

100. In an explosion-engine, a gear as J⁴ receiving motion from the piston, and having a bearing-face as J⁶ adapted to reciprocate therewith and adapted to engage a similar bearing-face as J⁷ whose path of motion coincides with that of the first-mentioned, and the said bearing-face J⁷ borne upon mechanism connected to the spring as of the spring-motor, whereby it is adapted to transmit power to the spring-motor when moving in one direction and is automatically freed from the engine by the motion upon the reverse motion of the gear J⁴.

101. In an engine a spring as of a spring-motor connected by mechanism with a lug as J⁷, the said lug adapted to be moved by the said mechanism in a fixed path, a piston provided with means for automatically running, and a similar lug as J⁶ driven thereby and moving in the path of the first-mentioned lug, whereby the two lugs strike upon one motion and separate upon the reverse.

102. In an explosion-engine, the spring of a spring-motor, a gear as R formed substantially shell-like and adapted to inclose in a measure, the said spring, a gear as J⁸ meshing with the aforementioned gear, and carrying a lug as J⁷ adapted to receive power from the piston or mechanism connected therewith, a gear J⁸ further adapted as by means of ratchet mechanism to transmit power to the shaft of the engine.

103. In an explosion-engine, a spring as of a spring-motor, a gear as R connected with one end of the said spring and further meshing with a gear as J⁸, adapted to receive impulses in one direction from the piston and to be free from the piston upon the reverse motion thereof, the said gear J⁸ also provided with a pawl or similar mechanism for engaging with the shaft.

104. In an explosion-engine, a gear as J⁸ provided upon one side with a lug or abutment adapted to receive power from mechanism connected with the piston, and provided upon the other side with a means as a ratchet for engaging a shaft connecting to an instrumentality, the said gear being in connection with a spring adapted to be compressed upon the motion of the said gear in one direction and to receive back the power from the spring thus stored in it upon the other and to deliver the power through the ratchet-like mechanism to the said instrumentality.

105. In an automobile vehicle, a shaft as Q' connected on the one hand with means whereby the rider is enabled to move the shaft and on the other to the spring of the spring-motor whereby the said shaft is adapted when so operated to change the tension of the said spring of the spring-motor.

106. In an explosion-engine a row of exhaust-ports as F⁴ extending circularly around the cylinder individually of small area and collectively of the area approved by practice for the exhaust-passage of explosion-engines, and whereby the exhaust-gases are broken up or subdivided into a number of smaller streams, in combination with a cape or band as O² extending around the outlet ends of the said port F⁴ near the said outlets and presenting a surface to the gases issuing from the said outlets substantially at right angles to the course of the gases at this point and to the axes of the said ports F⁴ and the said cape being open to the atmosphere at the top or bottom thereof or between the said ports F⁴, the aggregate area of such opening being such as to permit a substantial increase of volume of the exhaust as compared with the combined area of the outlets F⁴; and whereby the gases are first subdivided by the ports F⁴ and second impinge upon the cape O² and are thereby broken up with the formation of eddies or whirls, which use up a considerable portion of their energy, and whereby they are caused to pass from the cape in a larger volume and with lesser velocity than if projected directly into the atmosphere.

107. In an automobile vehicle the combination of an automatic engine, the driving-wheels and a spring-motor whose normal and continuous action is to receive impressed power, hold it for an instant and then deliver the power to the wheel and while delivering it be free from the engine.

108. In an automobile vehicle, the combination of an automatic engine, the driving-wheels and a spring-motor whose normal and continuous action is to receive impressed power, hold it for an instant and then deliver the power to the wheel and while delivering to be free from the engine, and whereby the power of the engine is converted so that while the engine runs with a constant speed the speed of the vehicle may be variable and of any assignable ratio to that of the engine.

109. In an automobile vehicle, the combination of an automatic engine, the driving-wheels of a vehicle and a spring-motor whose normal and continuous action is to receive impressed power from the engine, hold it for an instant and deliver the power to the said wheels and while delivering be free from the engine and means of varying the power of the spring in action whereby the power of the engine is converted so that the power of advance of the said vehicle may be of any assignable proportion to the power of the said engine.

110. The combination of a continuously-running engine, an independent controllable spring-motor or power-transformer combined with the engine and connected with the driving-wheel of the machine, and means for regulating or stopping the action of the motor or power-transformer without stopping the engine.

111. In an explosion-engine, a combustion-chamber, a compression-chamber for receiving a gaseous charge, a piston working in said compression-chamber, adapted to transfer the gaseous charge from the compression-chamber to the combustion-chamber, the said piston also adapted to be actuated in one direction by the explosion in the combustion-chamber, a spring K adapted to absorb force from the explosion and to absorb the momentum of the piston on the explosion stroke and to return the piston and thereby compress the gases in the combustion-chamber on the return stroke, a main shaft as Q and means connecting the said piston to the said shaft whereby the rectilinear movement of the piston is converted to rotary motion of the shaft.

112. In an explosion-engine, a combustion-chamber, a compression-chamber for receiving a gaseous charge, a piston working in said compression-chamber, adapted to transfer the gaseous charge from the compression-chamber to the combustion-chamber, the said piston also adapted to be actuated in one direction by the explosion in the combustion-chamber, a spring as K adapted to absorb force from the explosion and to absorb the momentum of the piston on the explosion stroke and to return the piston and compress the gases in the combustion-chamber on the return stroke, a main shaft as Q and means as a ratchet and pawl connecting the said piston to the said shaft whereby the said piston is connected on the one stroke to and released upon the return stroke from the said shaft.

113. In an explosion-engine an abutment as J⁶ connected to the reciprocating parts of said engine and driven thereby forward and back in a fixed path, a second abutment as J⁷ movable within the same path as the first and adapted to be engaged and carried by the first upon one stroke of the engine, and mechanism within the control of the rider for automatically returning the abutment J⁷ into position to be again engaged by the abutment J⁶, the said return of J⁷ being accomplished while the abutment J⁶ is upon the return or second stroke of the engine, and the abutment J⁶ adapted to engage the abutment J⁷ upon the first stroke (if J⁷ be in position) and to separate away therefrom on the second stroke.

114. In a carbureter a spray-chamber as M⁶, an oil-reservoir as N, means for forming a spray in said chamber, a valve as $m^2$ in the lower part of said chamber and means for lifting and seating said valve periodically, whereby the surplus oil which may condense from said spray is enabled to flow back into said reservoir N.

115. In a carbureter or spray-maker a reservoir as N from which portions are withdrawn to form spray or vapor, an oil-supply as C air-tight except as to the passage connecting the two, the said supply C located somewhat above the reservoir N and connecting therewith by a relatively small passage $c^4$ whereby the amount of oil in the reservoir N is regulated by the action of the atmosphere, oil flowing into the reservoir and air flowing into the supply C until the passage $c^4$ is immersed by the rise of oil in the reservoir, when further flow is stopped by the cessation of the flow of air caused by the immersion of said passage $c^4$.

116. In a spray-maker or carbureter, a closed chamber as $M^6$ within which the spray or vapor is formed and which is also adapted to act as a reservoir and by the expansion of its gaseous contents cause the return flow of spray or vapor therefrom, a pipe or passage as $M^2$ conveying pulsations of pressure to said chamber and a pipe or passage as $M'$ conveying back to the vapor or spray by the elasticity thereof, and oil connections as $M^5$ whereby oil may be introduced into said pipe or passage $M^2$, this pipe or passage also having one or more openings into said chamber $M^6$.

HERBERT B. STEELE.

Witnesses:
F. F. RAYMOND, 2d,
J. M. DOLAN.